(12) United States Patent
 Li

(10) Patent No.: US 11,395,220 B2
(45) Date of Patent: Jul. 19, 2022

(54) METHOD AND APPARATUS FOR ALLOCATING RESOURCE TO NETWORK SLICE

(71) Applicant: HUAWEI TECHNOLOGIES CO., LTD., Guangdong (CN)

(72) Inventor: Zhuoming Li, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 66 days.

(21) Appl. No.: 17/106,765

(22) Filed: Nov. 30, 2020

(65) Prior Publication Data
US 2021/0084582 A1   Mar. 18, 2021

Related U.S. Application Data

(63) Continuation of application No. PCT/CN2019/086150, filed on May 9, 2019.

(30) Foreign Application Priority Data

Jun. 30, 2018 (CN) .............................. 201810703615

(51) Int. Cl.
 *H04W 48/18*   (2009.01)
 *H04L 41/0893*  (2022.01)
 (Continued)

(52) U.S. Cl.
 CPC ......... *H04W 48/18* (2013.01); *H04L 41/0893* (2013.01); *H04W 24/02* (2013.01); *H04W 28/16* (2013.01)

(58) Field of Classification Search
 CPC ..... H04W 48/18; H04W 24/02; H04W 28/16; H04W 16/02; H04W 24/10;
 (Continued)

(56) References Cited

U.S. PATENT DOCUMENTS 10,939,370 B2 * 3/2021 Baek ..................... H04W 48/06
11,284,250 B2 * 3/2022 Ohlsson ............. H04W 12/037
(Continued)

FOREIGN PATENT DOCUMENTS

CN    107295561 A   10/2017
CN    107889155 A    4/2018
(Continued)

OTHER PUBLICATIONS

Ericsson,"Solution to KI#1: Analytic Information Exposure to 5GS Nf",Sa WG2 Meeting #127-bis S2-184822,28th May Jun. 1, 2018, Newport Beach, USA,TOTAL 5 PAGES.
(Continued)

*Primary Examiner* — Julio R Perez
(74) *Attorney, Agent, or Firm* — Womble Bond Dickinson (US) LLP

(57) ABSTRACT

A method and an apparatus for allocating a resource to a network slice resolves a problem in the current technology that utilization of radio resource utilization cannot be improved. The method includes: sending, by an access network device, a request message to an AMF, where the request message is used to request resource allocation reference information of a network slice group, the resource allocation reference information includes running information of a network slice or running information of the network slice group, and the network slice belongs to the network slice group; after receiving the request message, sending, by the AMF, the resource allocation reference information to the access network device; receiving, by the access network device, the resource allocation reference information from the AMF; and updating, by the access network device, a radio resource of the network slice group based on the resource allocation by reference.

20 Claims, 11 Drawing Sheets

(51) Int. Cl.
*H04W 24/02* (2009.01)
*H04W 28/16* (2009.01)

(58) Field of Classification Search
CPC .......................... H04W 92/045; H04W 24/08; H04L 41/0893; H04L 41/00; H04L 41/147
See application file for complete search history.

(56) References Cited

U.S. PATENT DOCUMENTS

| | | | |
|---|---|---|---|
| 2017/0303259 A1 | 10/2017 | Lee et al. | |
| 2019/0335392 A1* | 10/2019 | Qiao | H04W 8/18 |
| 2020/0367084 A1* | 11/2020 | Hjelm | H04W 52/0216 |
| 2021/0153110 A1* | 5/2021 | Garcia Martin | H04L 67/2842 |
| 2021/0281983 A1* | 9/2021 | Gage | H04L 67/1023 |

FOREIGN PATENT DOCUMENTS

| | | | |
|---|---|---|---|
| CN | 108024253 A | 5/2018 |
| EP | 3493601 A1 | 6/2019 |
| WO | 2018019184 A1 | 2/2018 |
| WO | 2018027988 A1 | 2/2018 |

OTHER PUBLICATIONS

3GPP TR 23.791 V0.4.0 (Jun. 2018),3rd Generation Partnership Project;Technical Specification Group Services and System Aspects;Study of Enablers for Network Automation for 5G(Release 16),total 32 pages.
3GPP TS 28.541 V1.0.0 (Jun. 2018),3rd Generation Partnership Project Technical Specification Group Services and System Aspects;Telecommunication Management;Management and orchestration of networks and network slicing;NR and NG-RAN Network Resource Model (NRM);Stage 2 and stage 3 (Release 15 ),dated Jun. 6, 2018,total 35 pages.
3GPP TS 23.501 V15.2.0 (Jun. 2018),3rd Generation Partnership Project;Technical Specification Group Services and System Aspects;System Architecture for the 5G System;Stage 2(Release 15),dated Jun. 18, 2018,total 216 pages.
3GPP TS 23.502 V15.2.0 (Jun. 2018),3rd Generation Partnership Project;Technical Specification Group Services and System Aspects;Procedures for the 5G System;Stage 2(Release 15),dated Jun. 18, 2018,total 308 pages.
3GPP TS 23.503 V15.2.0 (Jun. 2018),3rd Generation Partnership Project;Technical Specification Group Services and System Aspects;Policy and Charging Control Framework for the 5G System;Stage 2(Release 15),dated Jun. 18, 2018,total 67 pages.
3GPP TR 23.786 V0.6.0 (Jun. 2018),3rd Generation Partnership Project;Technical Specification Group Services and System Aspects;Study on architecture enhancements for EPS and 5G System to support advanced V2Xservices Release 16),dated Jun. 6, 2018,total 51 pages.
3GPP TS 23.003 V15.4.0 (Jun. 2018),3rd Generation Partnership Project;Technical Specification Group Core Network and Terminals;Numbenng, addressing and identification(Release 15),dated Jun. 18, 2018,total 120 pages.
3GPP TS 28.541 V0.2.0 (Apr. 2018),3rd Generation Partnership Project Technical Specification Group Services and System Aspects;Telecommunication Management;Management and orchestration of networks and network slicing;NR and NG-RAN Network Resource Model (NRM);Stage 2 and stage 3 (Release 15 ),total 31 pages.

* cited by examiner

METHOD AND APPARATUS FOR ALLOCATING RESOURCE TO NETWORK SLICE

CROSS-REFERENCE TO RELATED APPLICATIONS

This application is a continuation of International Application No. PCT/CN2019/086150, filed on May 9, 2019, which claims priority to Chinese Patent Application No. 201810703615.9, filed on Jun. 30, 2018. The disclosures of the aforementioned applications are hereby incorporated by reference in their entireties.

TECHNICAL FIELD

This application relates to the field of communications technologies, and in particular, to a method and an apparatus for allocating a resource to a network slice.

BACKGROUND

Network slicing is a key feature of applying network function virtualization (NFV) and software defined networking (SDN) to a $5^{th}$ generation (5G) communications network. A physical network may be divided into a plurality of network slices. Each network slice constitutes an end-to-end logical network. The network slices are logically isolated from each other. Therefore, network slices are logical networks that are obtained through division of a communications network and that have specific network characteristics. A user may subscribe to a network slice from an operator to carry an application service of the user. The network slice provided by the operator for the user can meet a service requirement of the application service, or in other words, meet a requirement of a service level agreement (SLA).

To improve radio resource utilization, network slices may be grouped, and a quantity of groups of network slices may be less than a quantity of network slices obtained by dividing a core network (CN). Different network slice groups may use different radio resources. For example, network slices of an ultra-reliable and low latency communications (uRLLC) type are grouped into one group, network slices of an enhanced mobile broadband (eMBB) type are grouped into one group, and network slices of a massive machine type communications (mMTC) type are grouped into one group.

Network slice grouping and how to allocate a radio resource of a RAN to a network slice group obtained through grouping are configured by a management plane. For example, a relatively large quantity of idle resources are reserved for the network slice group. In such a configuration manner, real-time performance is poor, and the radio resource cannot be quickly adjusted when a network changes, resulting in low radio resource utilization.

SUMMARY

This application provides a method and an apparatus for allocating a resource to a network slice, to resolve a prior-art problem of low radio resource utilization.

Specific technical solutions provided in embodiments of this application are as follows:

According to a first aspect, an embodiment of this application provides a method for allocating a resource to a network slice. The method may be applied to an access network device. The method includes: sending, by the access network device, a request message to an AMF, where the request message is used to request resource allocation reference information of a network slice group, the resource allocation reference information includes running information of a network slice or running information of the network slice group, and the network slice belongs to the network slice group; receiving, by the access network device, the resource allocation reference information from the AMF; and updating, by the access network device, a radio resource of the network slice group based on the resource allocation reference information. According to the foregoing solution, after a network changes, the access network device can obtain the running information of the network slice after the change, and therefore can update the radio resource of the network slice group based on the obtained running information of the network slice. Because the network slice group no longer completely depends on configuration of a management plane, resource allocation can be adjusted in time based on the network change. Therefore, it is unnecessary to reserve a relatively large quantity of idle resources, but instead, whether to reserve an idle resource and a quantity of idle resources to be reserved are determined based on the running information of the network slice after the network changes, so that radio resource utilization can be improved.

In an embodiment, when the request message includes identification information of the network slice, the resource allocation reference information includes the running information of the network slice.

In an embodiment, the request message further includes location information, and the request message is used to request running information of the network slice in a region indicated by the location information. By requesting running information of the network slice at a specified location, the access network device may request running information of the network slice at a location of a neighboring cell in addition to running information of the network slice within a management range of the access network device. Because a user in a cell managed by the access network device may be handed over to the neighboring cell in the future, and similarly, a user in the neighboring cell may be handed over to the cell managed by the access network device in the future, accuracy is higher when the access network device requests running information of the network slice in the local cell and the neighboring cell, and updates the radio resource based on the running information of the network slice in the local cell and the neighboring cell.

In an embodiment, the running information of the network slice includes at least one of statistical information of the network slice and prediction information of the network slice; the statistical information of the network slice includes a statistical measurement indicator of the network slice, and the statistical measurement indicator of the network slice is used to evaluate resource occupancy of the network slice in preset duration; and the prediction information of the network slice includes a predicted value of the statistical measurement indicator of the network slice, and the predicted value of the statistical measurement indicator of the network slice is used to predict evaluated resource occupancy of the network slice.

In an embodiment, the statistical measurement indicator of the network slice includes at least one of the following: a quantity of registered users of the network slice, a quantity of users who have established a signaling connection in the network slice, a quantity of sessions that have been established in the network slice, or a session traffic volume in the network slice; or the predicted value of the statistical measurement indicator of the network slice includes at least one of the following: a predicted quantity of registered users of the network slice, a predicted quantity of users who establish a signaling connection in the network slice, a predicted quantity of established sessions in the network slice, or a predicted session traffic volume of the network slice.

In an embodiment, when the resource allocation reference information includes the running information of the network slice, the updating, by the access network device, a radio resource of the network slice group based on the resource allocation reference information includes: obtaining, by the access network device, the running information of the network slice group based on the running information of the network slice; and updating, by the access network device, the radio resource of the network slice group based on the running information of the network slice group.

According to the foregoing design, the access network device collects statistics on running information of each network slice group, and the AMF is configured to obtain only running information of each network slice.

In an embodiment, when the request message includes identification information of the network slice group and identification information of a network slice included in the network slice group, the resource allocation reference information includes the running information of the network slice group.

According to the foregoing design, the AMF obtains running information of each network slice group, so that the access network device does not need to collect statistics, thereby saving processing resources of the access network device.

In an embodiment, the request message further includes location information, and the request message is used to request running information of the network slice group in a region indicated by the location information.

In an embodiment, the running information of the network slice group includes at least one of statistical information of the network slice group and prediction information of the network slice group; and the statistical information of the network slice group includes a statistical measurement indicator of the network slice group, and the statistical measurement indicator of the network slice is used to evaluate resource occupancy of the network slice group in preset duration; and the prediction information of the network slice group includes predicted values of a plurality of statistical measurement indicators of the network slice group, and the predicted values of the statistical measurement indicators are used to predict evaluated resource occupancy of the network slice.

In an embodiment, the statistical measurement indicator of the network slice group includes at least one of the following: a quantity, corresponding to the network slice group, of registered users, a quantity, corresponding to the network slice group, of users who establish a signaling connection, a quantity, corresponding to the network slice group, of sessions that have been established, or a session traffic volume corresponding to the network slice group; or the predicted value of the statistical measurement indicator of the network slice group includes at least one of the following: a predicted quantity, corresponding to the network slice group, of registered users, a predicted quantity, corresponding to the network slice group, of users who establish a signaling connection, a predicted quantity, corresponding to the network slice group, of established sessions, or a predicted session traffic volume corresponding to the network slice group.

In an embodiment, the updating, by the access network device, a radio resource of the network slice group based on the resource allocation reference information includes: updating, by the access network device, the radio resource of the network slice group based on the resource allocation reference information and a resource management policy. The resource management policy is different from an existing RRM policy. The resource management policy includes a resource adjustment policy, and the resource adjustment policy includes a method for updating a radio resource of a network slice group based on resource allocation reference information, so that the access network device adjusts the radio resource of the network slice group in real time based on the resource management policy.

In an embodiment, the resource management policy includes a grouping adjustment policy and a resource adjustment policy; and the updating, by the access network device, the radio resource of the network slice group based on the resource allocation reference information and a resource management policy includes: updating, by the access network device, the network slice group based on the grouping adjustment policy and the resource allocation reference information; and updating, by the access network device, a radio resource of the updated network slice group based on the resource adjustment policy and running information of the updated network slice group.

In the foregoing design, the resource management policy may further include the grouping adjustment policy. Based on this, when determining that the group is not suitable, the access network device may first adjust the group, and then adjust the radio resource of the group, thereby improving resource utilization.

In an embodiment, the resource management policy further includes a resource allocation policy and an initial grouping policy; and before the sending, by the access network device, a request message to an AMF, the method further includes: obtaining, by the access network device, indication information based on the identification information of the network slice, where the indication information includes at least one of a network slice type indication of the network slice and an isolation requirement indication of a tenant to which the network slice belongs; grouping, by the access network device, the network slice into the network slice group based on the indication information and the initial grouping policy; and allocating, by the access network device, the radio resource to the network slice group based on the resource allocation policy.

In the foregoing design, both initial grouping of a network slice and a radio resource of an initial group are performed by the access network device, and do not need to be configured by the management plane, so that grouping and radio resource allocation can be optimized.

In an embodiment, the resource allocation reference information includes the running information of the network slice, and the method further includes: grouping, by the access network device, the network slice into a newly added network slice group based on the running information of the network slice; and allocating, by the access network device, a radio resource to the newly added network slice group based on the running information of the network slice. In the foregoing design, a manner of adjusting a group to which a network slice belongs is provided.

According to a second aspect, an embodiment of this application provides a method for allocating a resource to a network slice. The method includes: receiving, by an access and mobility management function AMF, a request message from an access network device, where the request message is used to request resource allocation reference information of a network slice group, the resource allocation reference information includes running information of a network slice or running information of the network slice group, and the network slice belongs to the network slice group; and sending, by the AMF, the resource allocation reference information to the access network device based on the request message. According to the foregoing solution, after a network changes, the access network device can obtain the running information of the network slice after the change, and therefore can update a radio resource of the network slice group based on the obtained running information of the network slice. Because the network slice group no longer completely depends on configuration of a management plane, resource allocation can be adjusted in time based on the network change. Therefore, it is unnecessary to reserve a relatively large quantity of idle resources, but instead, whether to reserve an idle resource and a quantity of idle resources to be reserved are determined based on the running information of the network slice after the network changes, so that radio resource utilization can be improved.

In an embodiment, when the request message includes identification information of the network slice, the resource allocation reference information includes the running information of the network slice; or when the request message includes identification information of the network slice group and identification information of a network slice included in the network slice group, the resource allocation reference information includes the running information of the network slice group.

In an embodiment, when the request message further includes location information, the running information of the network slice includes running information of the network slice in a region indicated by the location information; or the running information of the network slice group includes running information of the network slice group in a region indicated by the location information.

In an embodiment, the running information of the network slice group includes at least one of statistical information of the network slice group and prediction information of the network slice group; the statistical information of the network slice group includes a statistical measurement indicator of the network slice group, and the statistical measurement indicator of the network slice is used to evaluate resource occupancy of the network slice group in preset duration; and the prediction information of the network slice group includes a predicted value of the statistical measurement indicator of the network slice group, and the predicted value of the statistical measurement indicator of the network slice is used to predict evaluated resource occupancy of the network slice.

In an embodiment, the statistical measurement indicator of the network slice group includes at least one of the following: a quantity, corresponding to the network slice group, of registered users, a quantity, corresponding to the network slice group, of users who establish a signaling connection, a quantity, corresponding to the network slice group, of sessions that have been established, or a session traffic volume corresponding to the network slice group; or the predicted value of the statistical measurement indicator of the network slice group includes at least one of the following: a predicted quantity, corresponding to the network slice group, of registered users, a predicted quantity, corresponding to the network slice group, of users who establish a signaling connection, a predicted quantity, corresponding to the network slice group, of established sessions, or a predicted session traffic volume corresponding to the network slice group.

In an embodiment, the running information of the network slice includes statistical information of the network slice and/or prediction information of the network slice; and the statistical information of the network slice includes a statistical measurement indicator of the network slice, and the statistical measurement indicator of the network slice is used to evaluate resource occupancy of the network slice in preset duration; and the prediction information of the network slice includes a predicted value of the statistical measurement indicator of the network slice, and the predicted value of the statistical measurement indicator of the network slice is used to predict evaluated resource occupancy of the network slice.

In an embodiment, the statistical measurement indicator of the network slice includes at least one of the following: a quantity of registered users of the network slice, a quantity of users who have established a signaling connection in the network slice, a quantity of sessions that have been established in the network slice, or a session traffic volume in the network slice; or the predicted value of the statistical measurement indicator of the network slice includes at least one of the following: a predicted quantity of registered users of the network slice, a predicted quantity of users who establish a signaling connection in the network slice, a predicted quantity of established sessions in the network slice, or a predicted session traffic volume of the network slice.

In an embodiment, the sending, by the AMF, the resource allocation reference information to the access network device based on the request message includes: obtaining, by the AMF, the resource allocation reference information from an unstructured data storage function UDSF or a network data analysis function NWDAF based on the request message; and sending, by the AMF, the resource allocation reference information to the access network device.

According to the foregoing design, two manners of obtaining the resource allocation reference information by the AMF are provided.

In an embodiment, the obtaining, by the AMF, the resource allocation reference information from an NWDAF based on the request message includes: sending, by the AMF, a query request to the NWDAF based on the request message, where the query request is used to request the resource allocation reference information; and receiving, by the AMF, the resource allocation reference information from the NWDAF.

In an embodiment, when the request message includes the identification information of the network slice, the query request is used to request the running information of the network slice, and the query request includes the identification information of the network slice; or when the request message includes the identification information of the network slice group and the identification information of the network slice included in the network slice group, the query request is used to request the running information of the network slice group, and the query request includes the identification information of the network slice group and the identification information of the network slice included in the network slice group.

In an embodiment, when the request message further includes the location information, the query request further includes the location information.

According to a third aspect, an embodiment of this application provides a method for allocating a resource to a network slice. The method includes: receiving, by a network data analysis function NWDAF, a query request from an access and mobility management function AMF, where the query request is used to request resource allocation reference information of a network slice group, the resource allocation reference information includes running information of a network slice or running information of the network slice group, and the network slice belongs to the network slice group; and sending, by the NWDAF, the resource allocation reference information to the AMF based on the query request. The NWDAF collects the running information of the network slice group for an access network device to update a radio resource of the network slice group and no longer depend on radio resource configuration of a management plane for the network slice group. The running information, collected by the NWDAF, of the network slice group can reflect a network change, so that the radio resource updated by the access network device for the network slice group can adapt to the network change, thereby improving radio resource utilization.

In an embodiment, the query request includes identification information of the network slice group and identification information of a network slice included in the network slice group; and the sending, by the NWDAF, the resource allocation reference information to the AMF based on the query request includes: obtaining, by the NWDAF based on the query request, running information of the network slice included in the network slice group; and obtaining, by the NWDAF, the running information of the network slice group based on the obtained running information of the network slice, and sending the running information of the network slice group to the AMF.

In an embodiment, the query request further includes location information; and the obtaining, by the NWDAF based on the query request, running information of the network slice included in the network slice group includes: obtaining, by the NWDAF based on the query request, running information, in a region indicated by the location information, of the network slice included in the network slice group.

In an embodiment, the running information of the network slice group includes at least one of statistical information of the network slice group and prediction information of the network slice group; and the statistical information of the network slice group includes a statistical measurement indicator of the network slice group, and the statistical measurement indicator of the network slice group is used to evaluate resource occupancy of the network slice group in preset duration; and the prediction information of the network slice group includes a predicted value of a statistical measurement indicator of the network slice group, and the predicted value of the statistical measurement indicator of the network slice group is used to predict evaluated resource occupancy of the network slice.

In an embodiment, the statistical measurement indicator of the network slice group includes at least one of the following: a quantity, corresponding to the network slice group, of registered users, a quantity, corresponding to the network slice group, of users who establish a signaling connection, a quantity, corresponding to the network slice group, of sessions that have been established, or a session traffic volume corresponding to the network slice group; or the predicted value of the statistical measurement indicator of the network slice group includes at least one of the following: a predicted quantity, corresponding to the network slice group, of registered users, a predicted quantity, corresponding to the network slice group, of users who establish a signaling connection, a predicted quantity, corresponding to the network slice group, of established sessions, or a predicted session traffic volume corresponding to the network slice group.

According to a fourth aspect, an apparatus for allocating a resource to a network slice is provided. The apparatus has a function of implementing behavior of the access network device in any one of the first aspect or the embodiments of the first aspect. The function may be implemented by hardware, or may be implemented by hardware by executing corresponding software. The hardware or the software includes one or more modules corresponding to the foregoing function.

In an embodiment, the apparatus may be a chip or an integrated circuit.

In an embodiment, the apparatus includes a memory and a processor. The memory stores a set of programs, the processor is configured to execute the programs stored in the memory, and when the programs are executed, the apparatus may perform the method in any one of the first aspect or the embodiments of the first aspect.

In an embodiment, the apparatus further includes a transceiver, configured to perform communication between the apparatus and another network element.

In an embodiment, the apparatus is an access network device.

According to a fifth aspect, an apparatus for allocating a resource to a network slice is provided. The apparatus has a function of implementing behavior of the access and mobility management function AMF in any one of the second aspect or the embodiments of the second aspect. The function may be implemented by hardware, or may be implemented by hardware by executing corresponding software. The hardware or the software includes one or more modules corresponding to the foregoing function.

In an embodiment, the apparatus may be a chip or an integrated circuit.

In an embodiment, the apparatus includes a memory and a processor. The memory stores a set of programs, the processor is configured to execute the programs stored in the memory, and when the programs are executed, the apparatus may perform the method in any one of the second aspect or the embodiments of the second aspect.

In an embodiment, the apparatus further includes a transceiver, configured to perform communication between the apparatus and another network element.

In an embodiment, the apparatus is an AMF.

According to a sixth aspect, an apparatus for allocating a resource to a network slice is provided. The apparatus has a function of implementing behavior of the network data analysis function NWDAF in any one of the third aspect or the embodiments of the third aspect. The function may be implemented by hardware, or may be implemented by hardware by executing corresponding software. The hardware or the software includes one or more modules corresponding to the foregoing function.

In an embodiment, the apparatus may be a chip or an integrated circuit.

In an embodiment, the apparatus includes a memory and a processor. The memory stores a set of programs, the processor is configured to execute the programs stored in the memory, and when the programs are executed, the apparatus may perform the method in any one of the third aspect or the embodiments of the third aspect.

In an embodiment, the apparatus further includes a transceiver, configured to perform communication between the apparatus and another network element.

In an embodiment, the apparatus is an NWDAF.

According to a seventh aspect, a chip is provided. The chip is connected to a memory or the chip includes a memory, and is configured to read and execute a software program stored in the memory, to implement the method in any one of the foregoing aspects or the embodiments of the foregoing aspects.

According to an eighth aspect, a communications system is provided. The communications system includes apparatuses according to any two or more of the fourth aspect to the sixth aspect.

According to a ninth aspect, a computer storage medium is provided. The computer storage medium stores a computer program, and the computer program includes an instruction used to perform the method in any one of the foregoing aspects or the embodiments of the foregoing aspects.

According to a tenth aspect, a computer program product is provided. When a computer reads and executes the computer program product, the computer is enabled to perform the method in any one of the foregoing aspects or the embodiments of the foregoing aspects.

DESCRIPTION OF EMBODIMENTS

A method for allocating a resource to a network slice provided in embodiments of this application is applicable to communications systems of different radio access technologies, for example, a long term evolution (LTE) system, a 5th generation (5G) communications system, and a possible communications system in the future.

Figure 1:
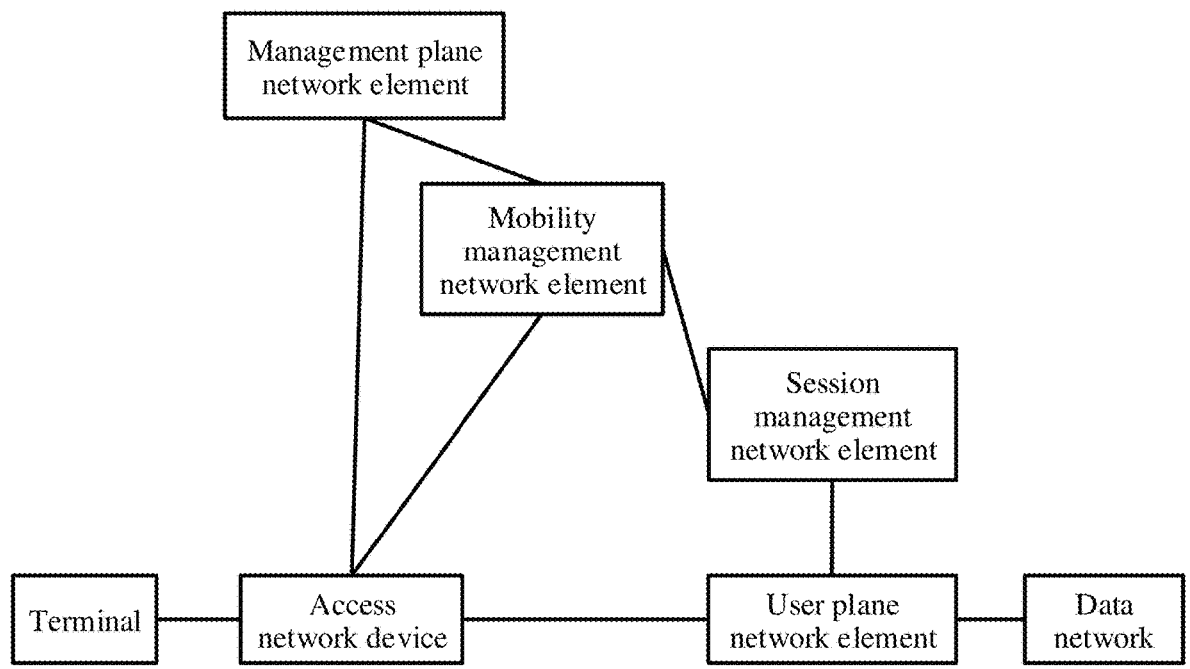
FIG. 1 is a schematic diagram of a system architecture according to an embodiment of this application.

FIG. 1 shows an example of a schematic diagram of a system architecture to which the embodiments of this application are applicable. The embodiments of this application are not limited to being applied to the system architecture shown in FIG. 1. Apparatuses shown in FIG. 1 may be hardware, or may be software obtained through functional division, or a structure obtained by combining the two. The system architecture shown in FIG. 1 includes a terminal, an access network (AN) device, a mobility management network element (which may also be referred to as a mobility management function/mobility management function entity), a session management network element (which may also be referred to as a session management function/session management function entity), a user plane network element (which may also be referred to as a user plane function/user plane function entity), a management plane network element, and a data network (DN) network. The terminal communicates with the DN by using the access network device and the user plane network element. The access network device and the mobility management network element are connected by using an N2 interface. The user plane network element and the access network device are connected by using an N3 interface. The user plane network element and the DN are connected by using an N6 interface. In addition, a plurality of user plane network elements may be connected by using an N9 interface (not shown in the figure). The interface name is merely an example for description. This is not specifically limited in the embodiments of this application.

The network element shown in FIG. 1 may be a network element in a 4G architecture, a network element in a 5G architecture, or a network element in a subsequent evolved architecture. This is not limited.

It should be noted that the network element in the embodiments of this application may also be referred to as a function or a function entity, and may be an independent physical device, or may be a logical function module. Different logical function modules may be located on a same physical device.

The terminal, also referred to as user equipment (UE), a mobile station (MS), a mobile terminal (MT), a terminal device, or the like, is a device that provides voice and/or data connectivity for a user. For example, the terminal includes a handheld device or an in-vehicle device having a wireless connection function. Currently, the terminal may be a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

The radio access network (AN) device is responsible for radio access of the terminal. A possible deployment form includes a scenario in which a centralized unit (CU) and a distributed unit (DU) are separated, and a scenario with a single site. The single site includes a gNB/NR-NB, a transmission/reception point (TRP), an evolved nodeB (eNB), a radio network controller (RNC), a nodeB (NB), and a base station controller (BSC), a base transceiver station (BTS), a home base station (for example, home evolved NodeB, or home NodeB), a baseband unit (BBU), a wireless fidelity (Wi-Fi) access point (AP), or the like. In a 5G communications system, the single site is a gNB/NR-NB. The CU supports protocols such as radio resource control (RRC), the packet data convergence protocol (PDCP), and the service data adaptation protocol (SDAP). The CU is generally deployed at a central office and has relatively rich computing resources. The DU mainly supports radio link control (RLC) layer, media access control (MAC) layer, and physical layer (PHY) protocols. The DU is generally deployed in a distributed manner. Generally, one CU needs to be connected to more than one DU. The gNB has functions of the CU and the DU, and is usually deployed as a single site.

The mobility management network element may be an access and mobility management function (AMF) in 5G, or may be a serving gateway (SGW) control plane function (SGW-C) or a mobility management entity (MME) in 4G, or may be all or some of control functions formed after the foregoing network elements are integrated. The mobility management network element is responsible for access and mobility management of the terminal in a mobile network. The AMF is responsible for access and mobility management, non-access stratum (NAS) message routing, SMF selection, and the like of the terminal. The AMF may be used as an intermediate network element to transmit a session management message between the terminal and an SMF. In future communication (for example, 6G or another network), the mobility management network element may still be an AMF network element or have another name. This is not limited in this application. In the embodiments of this application, the AMF in 5G is used as an example for description.

The session management network element is responsible for forwarding path management, for example, delivering a packet forwarding policy to the user plane network element, to instruct the user plane network element to process and forward a packet based on the packet forwarding policy. The session management network element may be a session management function (SMF) in 5G, and is responsible for session management, for example, session creation/modification/deletion, user plane network element selection, and user plane tunnel information allocation and management. Alternatively, the session management network element may be a serving gateway control plane function (SGW-C) or a packet data network (PDN) gateway (GW) control plane function (PGW-C) in 4G, or may be all or some of control functions formed after the SMF and PGW-C network elements are integrated. In future communication (for example, 6G or another network), the session management network element may still be an SMF network element or have another name. This is not limited in this application. In the embodiments of this application, the SMF in 5G is used as an example for description.

The user plane network element may be a user plane function (UPF) in a 5G architecture. The UPF is responsible for processing and forwarding a packet. Alternatively, the user plane network element may be a physical or virtual forwarding device such as a PGW forwarding plane function (PGW-U), an SGW forwarding plane function (SGW-U), a router, or a switch. In future communication (for example, 6G or another network), the user plane network element may still be a UPF network element or have another name. This is not limited in this application.

The management plane network element is configured to configure, in the access network device, data such as single network slice selection assistance information (S-NSSAI) of a network slice that needs to be supported and a radio resource management (RRM) policy. The management plane network element is further configured to: create and manage a core network part of the network slice, configure, in a core network device, the S-NSSAI of the network slice that needs to be supported, and perform performance management, fault management, and the like on the core network part of the network slice.

Figure 2A:
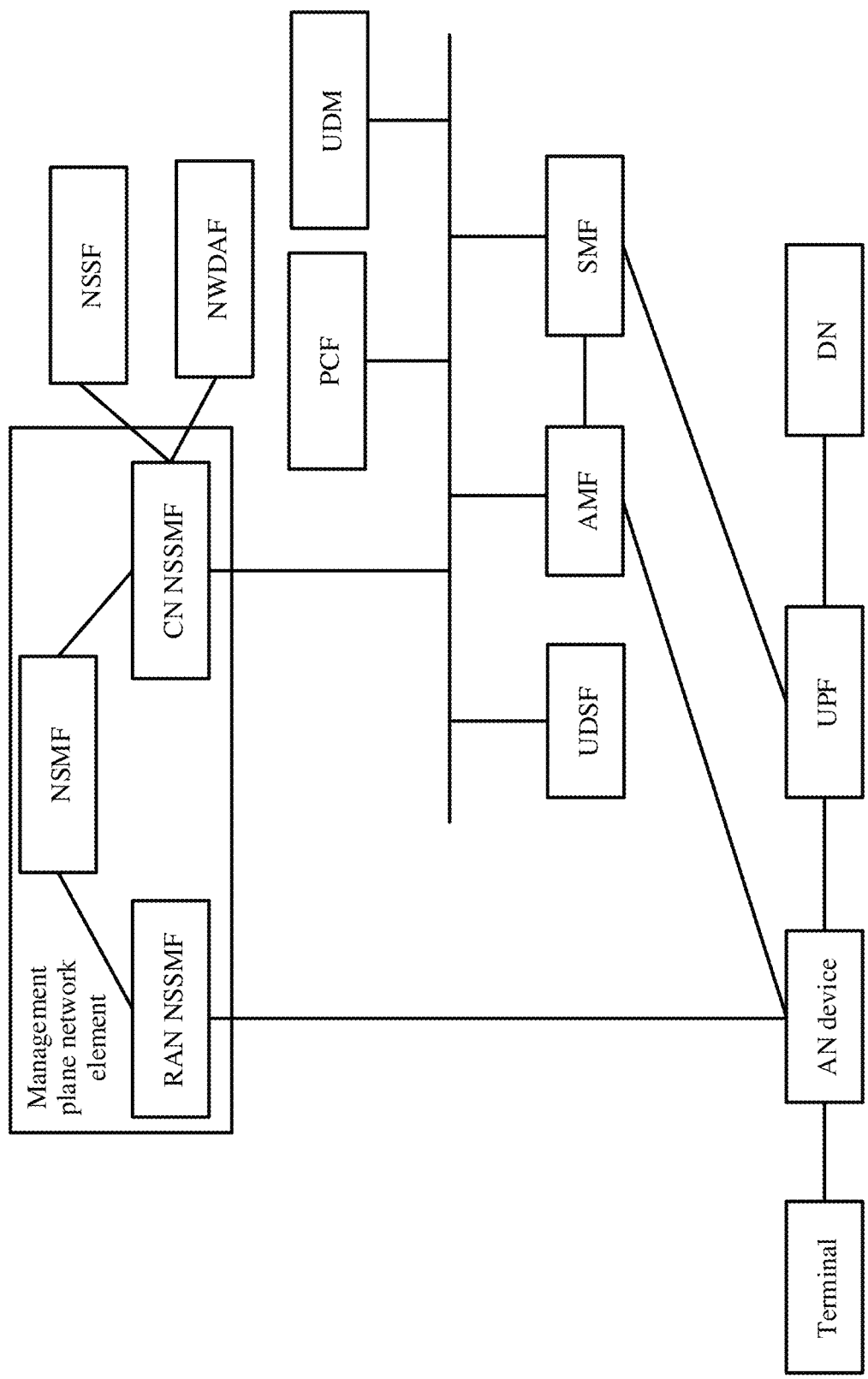
FIG. 2A is a schematic diagram of another system architecture according to an embodiment of this application.

For example, the system architecture shown in FIG. 1 may be applied to a 4G system architecture, and may also be applied to a 5G system architecture, or applied to a system architecture integrating 4G and 5G. In the embodiments of this application, a 5G system architecture shown in FIG. 2A is used as an example.

The 5G system architecture provided in the embodiments of this application may further include a policy control function (PCF) entity or a policy and charging control function (PCRF) entity. The PCF or the PCRF is responsible for policy control decision and flow-based charging control.

The system architecture may further include a subscriber data management (SDM) entity, or a home subscriber server (HSS). The subscriber data management entity in English may also correspond to user data management or unified data management, and may also correspond to UDM for short. The SDM, the UDM, or the HSS is configured to help an operator to manage all subscriber-related data in a unified manner.

The system architecture may further include an unstructured data storage function (UDSF), configured to store unstructured data of a network element, for example, a context of UE.

A network function repository function (NRF) stores information about many network elements, for example, information about the SMF, information about the UPF, and information about the AMF. Network elements such as the AMF, the SMF, and the UPF in the network may be all connected to the NRF. On one hand, one network element may register its own network element information with the NRF. On the other hand, another network element may obtain information about a registered network element from the NRF. The another network element (for example, the AMF) may request a selectable network element from the NRF based on a network element type, a data network identifier, unknown region information, and the like. If a domain name system (DNS) server is integrated into the NRF, a corresponding selection function network element (for example, the AMF) may request, from the NRF, another network element (for example, the SMF) to be selected.

A network slice selection network element (or a network slice selection function/network slice selection function entity) may be a network slice selection function (NSSF) in a 5G architecture, and is configured to select a suitable network slice for a service of the terminal.

A network data analysis network element (or a network data analysis function/network data analysis function entity) may be a network data analysis function (NWDAF) in a 5G architecture, and is configured to provide service functions such as data storage and analysis for a network.

The DN provides a data transmission service for the terminal, and may be a PDN network, for example, the Internet or an IP multimedia service (IMS).

The management plane network element may include a network slice management function (NSMF), a network slice subnet management function (NSSMF), and an element management system (EMS). The network slice subnet management function may be divided into a RAN NS SMF and a CN NSSMF. The NSMF is responsible for creating and managing a network slice, and allocating single network slice selection assistance information (S-NSSAI). The NSMF manages the RAN NS SMF and the CN NSSMF. The RAN NS SMF in a RAN subnet is responsible for network slice-related configuration and management of the RAN subnet. The CN NSSMF in a CN subnet is responsible for creation (that is, virtualized network function (VNF) deployment), configuration, and management of a network function of a network slice in the CN subnet. The RAN NSSMF configures network slice-related data such as network slice selection assistance information (NSSAI) and a radio resource management (RRM) policy for a RAN. The CN NSSMF configures network slice-related data such as S-NSSAI for network functions such as the AMF, the NSSF, and the NWDAF in a core network.

Figure 2B:
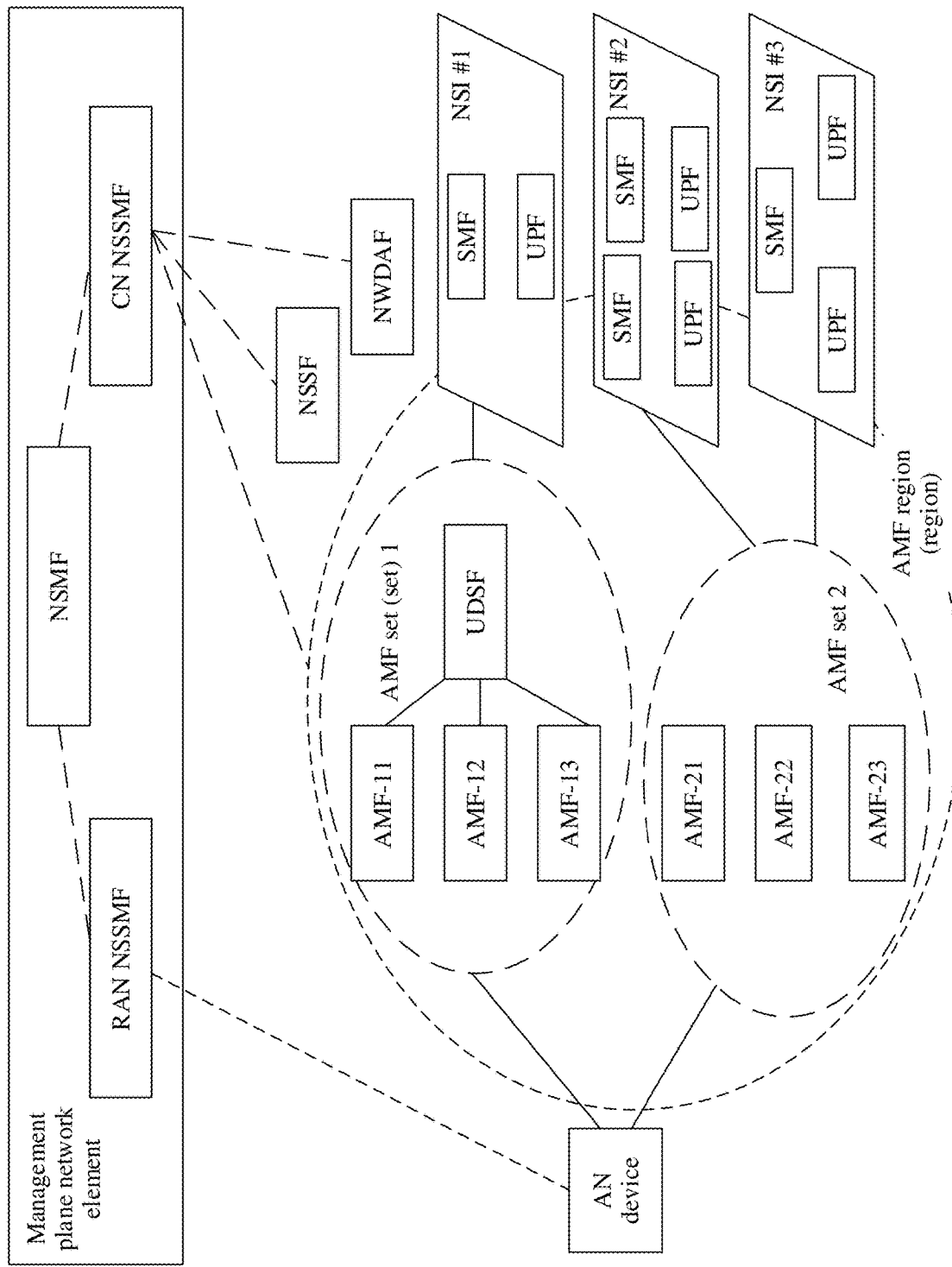
FIG. 2B is a schematic diagram of still another system architecture according to an embodiment of this application.

In addition, the access network device may correspond to a plurality of AMF sets, and one or more network slices are managed by one AMF set. The AMF set includes some AMFs. These AMFs may share mobility management context data by using a common storage function, or back up mobility management context data of each other. One AMF set provides access and mobility management services for one or more network slices in a given region. In one region, a plurality of AMF sets may separately provide access and mobility management services for some network slices. For one network slice, different AMF sets provide services in different regions. For example, as shown in FIG. 2B, an access network device corresponds to an AMF set 1 and an AMF set 2, each AMF set includes three AMFs, the AMF set 1 is configured to manage a network slice (NSI) #1, and the AMF set 2 is configured to manage an NSI #2 and an NSI #3.

In each network slice, an SMF and a UPF that perform function optimization for a service type supported by the network slice are usually deployed. The SMF is responsible for creating, modifying, or deleting a session for a terminal. The SMF selects and controls the UPF to establish, in the network slice, a session connection between the terminal and a DN. The UPF processes and forwards, based on a packet forwarding policy specified by the SMF, a data packet exchanged between the terminal and the DN.

Currently, the 3rd Generation Partnership Project (3GPP) protocol defines three types of network slices: eMBB, uRLLC, and mMTC. Each network slice type is specific to a particular service type. For example, the eMBB slice type is specific to a service with a high data rate and high mobility, an uRLLC slice may be used for processing in a high-reliability and low-latency communication scenario, and an mMTC slice may serve a large quantity of services (such as sensor and wearable device services) with a small data volume, a high latency, and infrequent access. As users and services have increasingly higher requirements on network service customization, differences between different network services further increase. In the context of in-depth research and large-scale commercial deployment of 5G communications networks, types of network slices will increase significantly in the foreseeable future.

One or more network slice instances may be deployed for each network slice type. A network slice instance is a static network, and means that different logical networks are customized on physical or virtual network infrastructure based on different service requirements. The network slice instance may be a complete end-to-end network that includes a terminal, an access network, a transport network, a core network, and an application server, can provide a complete communication service, and has a specific network capability. Alternatively, the network slice instance may be any combination of a terminal, an access network, a transport network, a core network, and an application server. In descriptions of the embodiments of this application, the network slice instance may also be referred to as a network slice.

After UE needing to use a network slice accesses a network, the network selects a network slice for the UE based on S-NSSAI carried in a service request of the UE. The S-NSSAI includes two parts: a slice/service type (SST) and a slice differentiator (SD). The SST identifies a slice type or a service type supported by a slice. The SD is a slice differentiator, and is used to distinguish different network slices of a same SST. For example, a water plant and a power plant separately subscribe to respective mMTC slices, and the two slices have a same SST but different SDs. The NSSAI is a set of S-NSSAI. The UE may access a plurality of network slices at the same time. Therefore, the UE and the network use the NSSAI to select a network slice.

The following Table 1 is a definition of an SST value in a current standard. The SST has eight bits. Except the standard definition, an operator may define a non-standard SST, for example, define 201 as representing an eMBB slice that is applicable to an AR/VR application and that has specific latency assurance and bandwidth assurance.

TABLE 1

| Slice/Service type | SST value | Slice feature |
| --- | --- | --- |
| eMBB | 1 | Slice suitable for enhanced mobile broadband services on 5G networks |
| URLLC | 2 | Slice suitable for ultra-reliable and low latency communications |
| mMTC | 3 | Slice suitable for massive Internet of Thing connections |

To improve radio resource utilization and reduce complexity of implementing a scheduling algorithm, network slices may be grouped. Generally, a quantity of groups of network slices on an access network side is less than a quantity of network slices obtained through division on a core network side. For example, one or more network slices of the uRLLC type that have strict requirements on both bandwidth and latency are grouped into one network slice group, and are scheduled with a highest priority. One or more network slices of the eMBB type that carry AR/VR and have a specific latency requirement are grouped into one network slice group, and are scheduled with a higher priority. One or more network slices of the eMBB type that carry another service are grouped into one network slice group, and are scheduled with an ordinary priority. All network slices of the mMTC type are grouped into one network slice group, and are scheduled with a lowest priority.

In the prior art, S-NSSAI of all network slices that need to be supported and an RRM policy are configured on an access network device by using a management plane network element. In addition, a group to which the network slices belong is also preconfigured by the management plane network element for the R access network device. The RRM policy specifies that a RAN may allocate and schedule a radio resource based on numerology. The numerology may include a subcarrier spacing, a symbol length, a cyclic prefix length, a transmission time interval, and the like. The access network device performs radio resource allocation and scheduling based on S-NSSAI and RRM policy configuration delivered by the management plane. Therefore, how to allocate radio resources to a plurality of network slices depends on the configuration of the management plane. When resource allocation needs to be updated, the management plane needs to perform reconfiguration. For example, addition, deletion, and regrouping of a network slice all require the management plane to reconfigure a resource for the radio access network device and the AMF. In such a method in which the management plane performs configuration to group network slices and allocate a resource to a group, real-time performance is poor, and a quick adjustment cannot be made after a network changes, but instead, a relatively large quantity of idle resources have to be reserved. Therefore, resource utilization cannot be further improved.

Based on this, the embodiments of this application provide a method and an apparatus for allocating a resource to a network slice. Not only performs a management plane configuration, but also an access network device obtains running information of a network slice or running information of a network slice group from an AMF or a management plane network element, to update a radio resource of the network slice group. With respect to the running information of the network slice or the running information of the network slice group, the running information includes a plurality of statistical measurement indicators and/or prediction indicators of the network slice or the network slice group. These indicators can be used to evaluate resource occupancy of the network slice, so that the access network can adjust the radio resource of the network slice group in real time based on the running information of the network slice or the running information of the network slice group, thereby meeting a requirement for improving resource utilization. The method and the apparatus are based on a same inventive concept. Because problem-resolving principles of the method and the apparatus are similar, mutual reference may be made between implementation of the apparatus and implementation of the method, and details are not repeated.

The following further describes in detail the embodiments of this application with reference to accompanying drawings.

Figure 3:
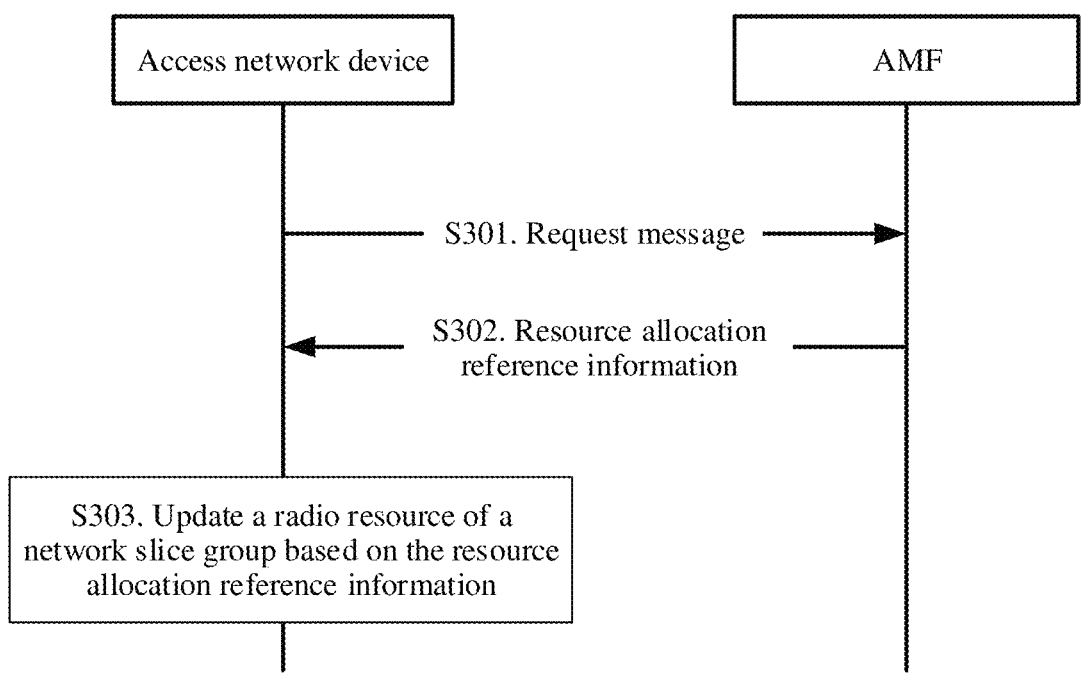
FIG. 3 is a schematic diagram of a first method for allocating a resource to a network slice according to an embodiment of this application.

FIG. 3 shows a method for allocating a resource to a network slice according to an embodiment of this application. In the method, an example in which an access network device obtains running information of a network slice or running information of a network slice group from an AMF is used for description.

S301. An access network device sends a request message to an AMF. The request message is used to request resource allocation reference information of a network slice group.

The resource allocation reference information is used by the access network device to allocate a radio resource to the network slice group. The resource allocation reference information may include running information of a network slice, and the network slice belongs to the network slice group. Alternatively, the resource allocation reference information includes running information of the network slice group.

The running information of the network slice may include statistical information of the network slice, or include prediction information of the network slice, or include statistical information of the network slice and prediction information of the network slice.

The statistical information of the network slice may include one or more statistical measurement indicators of the network slice, and the one or more statistical measurement indicators may be used to evaluate resource occupancy of the network slice in preset duration.

The prediction information of the network slice may include predicted values of the one or more statistical measurement indicators of the network slice, and the predicted values of the one or more statistical measurement indicators may be used to predict evaluated resource occupancy of the network slice. For example, the prediction information of the network slice may be prediction information, predicted based on the statistical information of the network slice, of the network slice group. For example, the predicted value of the statistical measurement indicator is determined based on the statistical measurement indicator of the network slice.

For example, the statistical measurement indicator of the network slice may include at least one of the following: a quantity of registered users of the network slice, a quantity of users who have established a signaling connection in the network slice, a quantity of sessions that have been established in the network slice, or a session traffic volume in the network slice.

The quantity of registered users of the network slice is used to describe a quantity of terminals that are successfully registered with the network slice. For example, a terminal successfully registered with the network slice may be a terminal that has been successfully registered with the AMF and whose allowed NSSAI included in a user context includes S-NSSAI corresponding to the network slice. The allowed NSSAI may be a set of S-NSSAI of network slices that are allowed to be accessed by the terminal and in which a current serving AMF successfully accepts registration of the terminal.

The quantity of users who have established a signaling connection in the network slice is used to describe a quantity of terminals that successfully establish a signaling connection to the network slice. A terminal that successfully establishes a signaling connection to the network slice may be a terminal that is successfully registered with the AMF, whose allowed NSSAI in a user context includes the S-NSSAI corresponding to the network slice, and whose connection status is a connected (CM-CONNECTED) state.

The quantity of sessions that have been established in the network slice may be a quantity of PDU session connections that have been successfully established in an SMF and that correspond to the S-NSSAI, included in a session context, of the network slice.

The session traffic volume in the network slice may be a total uplink traffic volume or a total downlink traffic volume, on an N3 interface, of a PDU session connection that has been successfully established in the SMF and that corresponds to the S-NSSAI of the network slice in a session context.

For example, the running information of the network slice group may be obtained after statistical processing is performed on running information of network slices included in the network slice group. The running information of the network slice group may include statistical information of the network slice group, or include prediction information of the network slice group, or include statistical information of the network slice group and prediction information of the network slice group.

A predicted quantity of registered users of the network slice may be an estimated value of a quantity of terminals that are successfully registered with the AMF in a future specified time range and whose allowed NSSAI included in a user context includes the S-NSSAI of the network slice.

A predicted quantity of users who establish a signaling connection in the network slice may be an estimated value of a quantity of terminals that are successfully registered with the AMF in a future specified time range, whose allowed NSSAI in a user context includes the S-NSSAI corresponding to the network slice, and whose connection status is the CM-CONNECTED state.

A predicted quantity of established sessions in the network slice may be a quantity of PDU session connections that are successfully established in the SMF in a future specified time range and that correspond to the S-NSSAI, included in a session context, of the network slice.

A predicted session traffic volume in the network slice may be a predicted value of a total uplink traffic volume or a total downlink traffic volume, on the N3 interface, of a PDU session connection that is successfully established in the SMF in a future specified time range and that corresponds to the S-NSSAI of the network slice in a session context.

The statistical information of the network slice group includes one or more statistical measurement indicators of the network slice group, and the one or more statistical measurement indicators of the network slice group are used to evaluate resource occupancy of the network slice group in preset duration.

The prediction information of the network slice group includes predicted values of the one or more statistical measurement indicators of the network slice group, and the predicted values of the one or more statistical measurement indicators of the network slice group are used to predict evaluated resource occupancy of the network slice. For example, the prediction information of the network slice group may be prediction information, predicted based on the statistical information of the network slice group, of the network slice group.

For example, the statistical measurement indicator of the network slice group includes at least one of the following: a quantity, corresponding to the network slice group, of registered users, a quantity of users who have established a signaling connection in the network slice group, a quantity, corresponding to the network slice group, of sessions that have been established, a session traffic volume corresponding to the network slice group, or the like. The quantity, corresponding to the network slice group, of registered users is quantities of registered users in the network slices included in the network slice group. For example, the quantities of registered users of the network slices included in the network slice group may be counted. For example, a repeatedly counted registered user is removed, and deduplication processing is performed on a same registered user in different network slices, to obtain the quantity, corresponding to the network slice group, of registered users.

If a terminal is successfully registered with a plurality of network slices, that is, a user context includes a plurality of pieces of S-NSSAI, and the plurality of pieces of S-NSSAI belong to a same network slice group, when a quantity of registered users in the network slice group is counted, the same terminal corresponding to the plurality of pieces of S-NSSAI that belong to the same network slice group may be counted only once.

For example, the predicted value of the statistical measurement indicator of the network slice group includes at least one of the following: a predicted quantity, corresponding to the network slice group, of registered users, a predicted quantity of users who establish a signaling connection in the network slice, a predicted quantity, corresponding to the network slice group, of established sessions, or a predicted session traffic volume corresponding to the network slice group.

When the request message includes identification information of the network slice, the request message may be used to request the running information of the network slice, and the resource allocation reference information may include the running information of the network slice. Further, the request message may further include location information, and the request message is specifically used to request running information of the network slice in a region indicated by the location information.

When the request message includes identification information of the network slice group and identification information of a network slice included in the network slice group, the request message may be used to request the running information of the network slice group, and the resource allocation reference information may include the running information of the network slice group. Further, the request message may further include location information, and the request message is specifically used to request running information of the network slice group in a region indicated by the location information.

Figure 4:
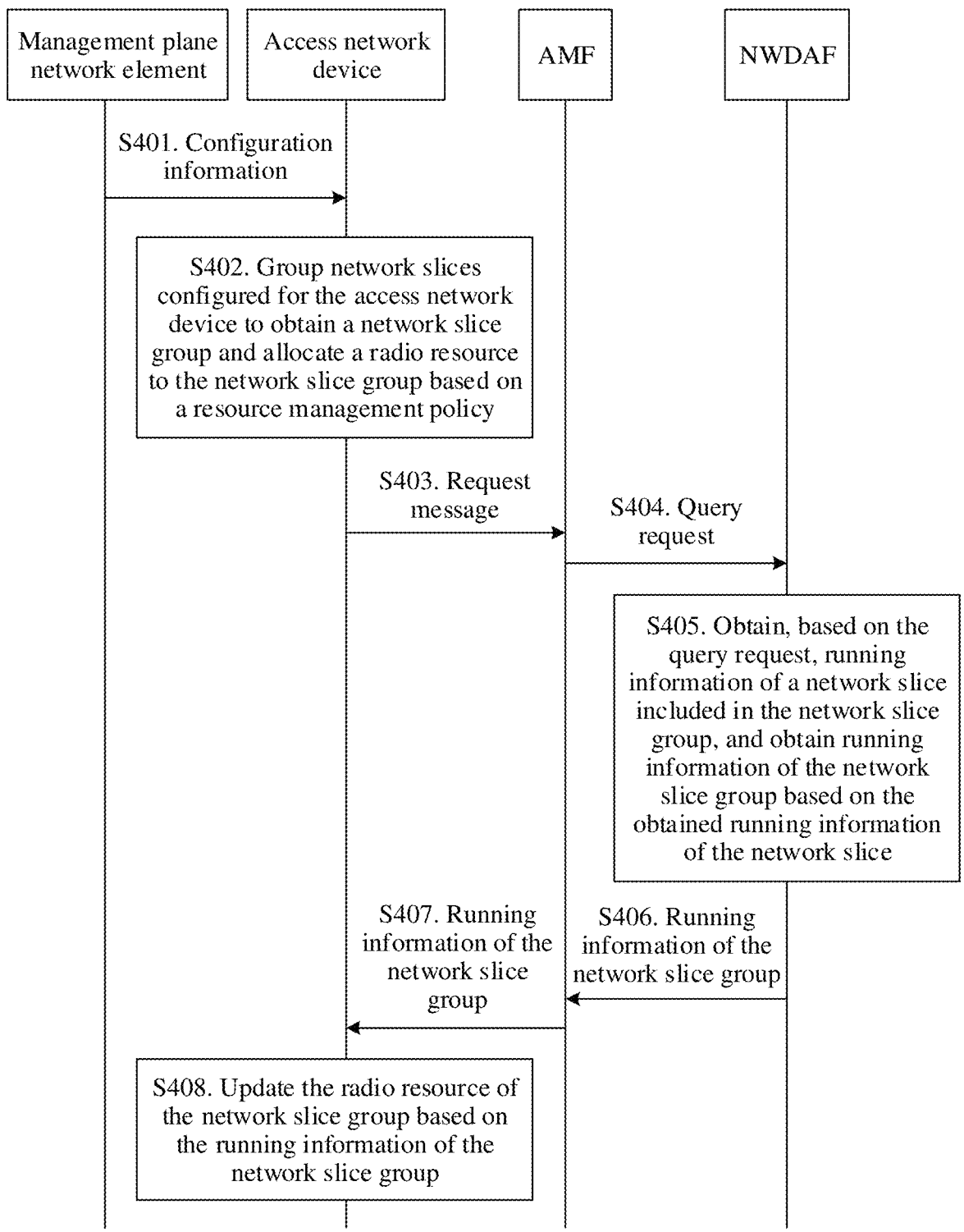
FIG. 4 is a schematic diagram of a second method for allocating a resource to a network slice according to an embodiment of this application.

For the location information, refer to related descriptions in an embodiment shown in FIG. 4.

S302. The AMF receives the request message from the access network device, and sends the resource allocation reference information to the access network device based on the request message.

S303. After receiving the resource allocation reference information from the AMF, the access network device updates a radio resource of the network slice group based on the resource allocation reference information.

According to the foregoing solution, after a network changes, the access network device can obtain the running information of the network slice after the change, and therefore can update the radio resource of the network slice group based on the obtained running information of the network slice. Because the network slice group no longer completely depends on configuration of a management plane, resource allocation can be adjusted in time based on the network change. Therefore, it is unnecessary to reserve a relatively large quantity of idle resources, but instead, whether to reserve an idle resource and a quantity of idle resources to be reserved are determined based on the running information of the network slice after the network changes, so that radio resource utilization can be improved.

In an embodiment, when the resource allocation reference information includes the running information of the network slice, operation S303 of updating, by the access network device, a radio resource of the network slice group based on the resource allocation reference information may be implemented in the following manner: obtaining, by the access network device, the running information of the network slice group based on the running information of the network slice; and updating, by the access network device, the radio resource of the network slice group based on the running information of the network slice group. For a specific embodiment process of obtaining, by the access network device, the running information of the network slice group based on the running information of the network slice, refer to related descriptions of S606 in FIG. 4. Details are not described herein.

In an embodiment, a management plane network element may pre-configure a resource management policy for the access network device. The resource management policy may include a resource allocation policy, and the resource allocation policy includes a method for updating a radio resource of a network slice group based on resource allocation reference information. Therefore, in operation S303, when updating the radio resource of the network slice group based on the resource allocation reference information, the access network device may update the radio resource of the network slice group based on the resource allocation reference information and the resource management policy. The resource management policy in this embodiment of this application may be configured in an RRM policy, or may be separately configured for the access network device. Specifically, how the access network device updates the radio resource of the network slice group based on the resource allocation reference information and the resource management policy is described in detail in a subsequent embodiment.

For example, when the resource allocation reference information includes the running information of the network slice, the updating, by the access network device, the radio resource of the network slice group based on the resource allocation reference information and the resource management policy may be implemented in the following manner: obtaining, by the access network device, the running information of the network slice group based on the running information of the network slice, and updating the radio resource of the network slice group based on the running information of the network slice group and the resource management policy.

For example, the resource management policy may include a grouping adjustment policy and a resource adjustment policy; and the updating, by the access network device, the radio resource of the network slice group based on the resource allocation reference information and the resource management policy may be implemented in the following manner: updating, by the access network device, the network slice group based on the grouping adjustment policy and the resource allocation reference information; and updating, by the access network device, a radio resource of the updated network slice group based on the resource adjustment policy and running information of the updated network slice group.

The grouping adjustment policy specifies a method for adjusting a current network slice group, for example, a method for deleting a network slice group, a method for adding a network slice group, or a method for changing a network slice included in a network slice group. The resource adjustment policy specifies a method for updating a radio resource allocated to a network slice group, for example, increasing a quantity of radio resources reserved for a network slice group, or releasing some radio resources of a network slice group.

In addition, it should be noted that in this embodiment of this application, an initial network slice group may be preconfigured by the management plane network element. Alternatively, an initial grouping policy may be preconfigured by the management plane network element for the access network device. The initial grouping policy may be included in the resource management policy. The initial grouping policy includes a method for grouping network slices configured for the access network device.

Similarly, a radio resource initially allocated to a network slice group may also be preconfigured by the management plane network element. Alternatively, a resource allocation policy may be preconfigured by the management plane network element for the access network device. The resource allocation policy may be included in the resource management policy. The resource allocation policy includes a method for allocating a radio resource to an initial network slice group, so that the access network device allocates, based on the resource allocation policy, a radio resource to an initial network slice group obtained through grouping.

In an example, the initial grouping policy may include a method for grouping network slices based on network slice type indications and/or isolation requirement indications of tenants to which the network slices belong.

Before operation S301 of sending, by an access network device, a request message to an AMF, the access network device may obtain indication information based on the identification information of the network slice. The indication information includes at least one of a network slice type indication of the network slice and an isolation requirement indication of a tenant to which the network slice belongs. Therefore, the access network device groups the network slice based on the indication information and the initial grouping policy, that is, groups the network slice into the network slice group. The access network device allocates the radio resource to the network slice group based on the resource allocation policy.

For example, the identification information of the network slice may be the S-NSSAI. The S-NSSAI includes two parts: an SST and an SD. The SST is a network slice type indication, and is used to identify a slice/service type. The SD is a slice differentiator, and is used to distinguish different network slices of a same SST. The SD includes a plurality of bits. Some consecutive bits may be used as a tenant identifier, and some bits may be used as an isolation level field, to indicate the isolation requirement of the tenant. For example, bits 9 to 16 in the SD are used to indicate the tenant identifier. Bits 1 and 2 of the SD are used as the isolation level field, to indicate the isolation requirement of the tenant. For example, ISOLAT represents the isolation level field, and when a value of ISOLAT ranges from 0 to 3, ISOLAT-3 indicates allocation of a particular frequency band for isolation, ISOLAT-2 indicates allocation of a fixed time for isolation, and ISOLAT-1 indicates dynamic allocation of different subcarriers for isolation, and ISOLAT-0 indicates that there is no isolation requirement. Which bits of the SD in the S-NSSAI are used to indicate the tenant identifier and which bits are used to indicate the isolation level may be specified in a protocol in advance, or may be configured by the management plane network element for the access network device. For example, a method for obtaining a tenant identifier from an SD of S-NSSAI and a method for obtaining an isolation requirement of a tenant may be specified in the initial grouping policy.

In an example, the following scenario is used as an example to describe the method, included in the initial grouping policy, for grouping network slices based on network slice type indications and/or isolation requirement indications of tenants to which the network slices belong.

Tenants A, B, and C each subscribe to two network slices. It is assumed that S-NSSAI is A1, A2, B1, B2, C1, and C2 respectively. From the S-NSSAI, a range of values of network slice type indications (that is, SSTs) that can be extracted is 1 to 3 (that is, standard types) and 201 (that is, a custom type), and a range of values of isolation level fields that can be extracted is 0 to 3. An A1 network slice requires a dedicated spectrum to be used, that is, ISOLAT-3 may be extracted from A1. An A2 network slice is a uRLLC network slice that uses a common spectrum and that is used for industrial control, that is, SST-2 and ISOLAT-0 may be extracted from A2. A B1 network slice is an eMBB network slice that is used to perform device inspection at a fixed time at night and that requires fixed bandwidth to be allocated within the fixed time, that is, SST-1 and ISOLAT-2 may be extracted from B1. A B2 network slice is a common mMTC network slice that is used for remote measurement and meter reading and that has no isolation requirement, that is, SST-3 and ISOLAT-0 may be extracted from B2. A C1 network slice is an eMBB network slice that is used for remote video surveillance and that needs to be isolated from another eMBB network slice to ensure bandwidth, that is, SST-1 and ISOLAT-1 may be extracted from C1. A C2 network slice is a common eMBB network slice that is used for remote version update of a device, that is, SST-1 may be extracted from C2.

The access network device may perform grouping in a grouping manner shown in the following Table 2. For network slices at isolation levels ISOLAT-3 and ISOLAT-2, network slices of different slice types are grouped into different network slice groups. For network slices whose slice types are SST-2, network slices whose isolation levels are not ISOLAT-3 and ISOLAT-2 are grouped into one network slice group. Network slices whose slice types are SST-201 and isolation levels are ISOLAT-1 are grouped into one network slice group. Network slices whose slice types are SST-1 and SST-3 and isolation levels are ISOLAT-0 are grouped into one network slice group. In this way, the access network device obtains five network slice groups {A1}, {B1}, {A2}, {B2, C2}, and {C1} through grouping based on the SSTs and the isolation requirements of the tenants, to respectively provide services for the six network slices.

TABLE 2

| ISOLAT-3, ISOLAT-2 |
| SST-2 |
| SST-201, ISOLAT-1 |
| SST-1, SST-3, ISOLAT-0 |

In another example, the initial grouping policy may include a method for grouping network slices based on network slice type indications and/or isolation requirement indications of tenants to which the network slices belong, and scheduling priorities.

Different types of network slices may correspond to different scheduling priorities, and different types of isolation requirements may also correspond to different scheduling priorities. For example, based on priorities, the values of the SSTs are sequenced as follows: SST-2≥SST-201>SST-1≥SST-3. For example, based on priorities, the isolation requirements are sequenced as follows: ISOLAT-3=ISOLAT-2>ISOLAT-1>ISOLAT-0.

For example, scheduling priorities may be classified into four levels PR1-1 to PR1-4 in descending order. A correspondence between an isolation requirement of a tenant, an SST service type, and a scheduling priority may be configured as shown in Table 3. When performing resource scheduling, the access network device preferentially allocates a radio resource to a high-priority network slice, to preferentially ensure that the radio resource of the high-priority network slice is scheduled on time.

TABLE 3

| PRI-1 | ISOLAT-3, ISOLAT-2 |
| PRI-2 | SST-2 |
| PRI-3 | SST-201, ISOLAT-1 |
| PRI-4 | SST-1, SST-3, ISOLAT-0 |

When the access network device groups network slices based on network slice type indications and/or isolation requirement indications of tenants to which the network slices belong, and scheduling priorities, in one manner, network slices with a same scheduling priority are grouped into one group. In another manner, after grouping is performed based on the scheduling priorities, each group obtained through grouping based on a scheduling priority is further refined based on network slice types and/or isolation requirements of tenants to which network slices belong. For example, in the foregoing scenario of the tenants A, B, and C, a result of grouping based on scheduling priorities is shown in Table 4.

TABLE 4

| PRI-1 | {A1, B1} |
| PRI-2 | {A2} |
| PRI-3 | {C1} |
| PRI-4 | {B2, C2} |

For example, after grouping is performed based on the scheduling priorities, when a group is refined based on network slice types and/or isolation requirements of tenants to which network slices belong, because isolation requirements of tenants to which the network slice A1 and the network slice B1 belong are different, the network slice A1 and the network slice B1 are grouped into different network slice groups. In this way, the access network device obtains five network slice groups {A1}, {B1}, {A2}, {B2, C2}, and {C1} through grouping based on the SSTs, the isolation requirements of the tenants, and the scheduling priorities, to respectively provide services for the six network slices.

For example, when allocating, based on the resource allocation policy, a radio resource to an initial network slice group obtained through grouping, the access network device may determine a quantity of radio resources for each network slice group based on a service scale and a predicted service scale of a network slice, for example, determine, for each of {A1}, {B1}, {A2}, {B2, C2} and {C1}, a frequency band, a timeslot, a subcarrier, a subcarrier spacing, and the like to be allocated.

In an embodiment, after receiving the request message from the access network device, the AMF may obtain the resource allocation reference information in any one of the following manners:

In an embodiment, the AMF obtains the resource allocation reference information from an NWDAF. In an embodiment, refer to related descriptions of S404 to S406 in an embodiment shown in FIG. 5.

In an embodiment, the AMF obtains the resource allocation reference information from a USDF. In an embodiment, refer to related descriptions of S604 in an embodiment shown in FIG. 6.

In an embodiment, the AMF obtains the resource allocation reference information from information stored in the AMF. In an embodiment, refer to related descriptions of S704 in an embodiment shown in FIG. 7.

The method for allocating a resource to a network slice provided in the embodiments of this application is described below in more detail with reference to a procedure shown in FIG. 3. It should be noted that the following method procedure is described relatively comprehensively, some operations or descriptions are embodiments, and any two or more operations in the method procedure may constitute a solution that needs to be protected in the embodiments of this application. In other words, when some operations are optional, remaining operations may still constitute a solution that needs to be protected in the embodiments of this application, and the optional operations may further have other embodiments. In addition, in the following descriptions, operations performed by an access network device, an AMF, and an NWDAF may respectively form independent technical solutions.

Referring to FIG. 4, a method for allocating a resource to a network slice in the first embodiment is described in detail.

S401. A management plane network element (for example, a RAN NSSMF) sends configuration information to an access network device.

The configuration information may include network slice-related configuration. For example, the network slice-related configuration includes S-NSSAI and an RRM policy, and the RRM policy includes a resource management policy. For another example, the network slice-related configuration may include S-NSSAI, an RRM policy, and a resource management policy.

In an embodiment, when the resource management policy includes an initial grouping policy and a resource allocation policy, in S402, the access network device groups network slices configured for the access network device to obtain a network slice group and allocates a radio resource to the network slice group based on the resource management policy.

For a specific embodiment of grouping, by the access network device, network slices configured for the access network device to obtain a network slice group and allocating a radio resource to the network slice group based on the resource management policy, refer to related descriptions in the embodiment corresponding to FIG. 4. Details are not described herein again.

For example, this embodiment of this application is not limited to triggering, when the management plane network element configures the S-NSSAI and the resource management policy for the access network device, the access network device to perform operation S402. When the management plane updates the S-NSSAI configured for the access network device, the access network device may be triggered to perform operation S402. Alternatively, when the management plane updates the resource management policy configured for the access network device, the access network device may be triggered to perform operation S402.

For ease of description, in this embodiment of this application, a network slice group obtained through grouping and information obtained by allocating a radio resource to the network slice group by the access network device are collectively referred to as network slice group information.

The network slice group information may be used to describe a correspondence between S-NSSAI and a radio resource allocated to a network slice group. Specifically, the network slice group information may include an identifier of a network slice group, one or more pieces of corresponding S-NSSAI, and a corresponding radio resource that are allocated by the access network device. For example, five pieces of network slice group information of {A1}, {B1}, {A2}, {B2, C2}, and {C1} in the foregoing example are shown in Table 5. The first column indicates radio resources allocated to the network slices, the second column indicates identifiers of the network slice groups, and the third column indicates S-NSSAI included in the network slice groups.

TABLE 5

| Radio resource #1 | Group #1 | S-NSSAI #A1 |
| Radio resource #2 | Group #2 | S-NSSAI #B1 |
| Radio resource #3 | Group #3 | S-NSSAI #A2 |
| Radio resource #4 | Group #4 | S-NSSAI #C1 |
| Radio resource #5 | Group #5 | S-NSSAI #B2, S-NSSAI #C2 |

S403. The access network device sends a request message to an AMF.

Herein, an example in which the request message is used to request running information of a network slice group is used for description in this embodiment of this application.

For example, the access network device may send the request message to the AMF by using N2 interface signaling.

The request message may include identification information of one or more network slice groups and identification information of a network slice included in the network slice group, for example, an S-NSSAI list included in the network slice group.

For example, the network slice included in the network slice group is all network slices that are configured on the access network device and that belong to the network slice group.

In an embodiment, the request message may further include location information.

Therefore, the request message may be used to request running information of the network slice group in a region indicated by the location information.

In an embodiment, when the network slice included in the network slice group is a network slice in a particular region, if the request message does not include location information, the request message is used to request running information of the network slice group in the particular region.

The location information may be a cell identity Cell-ID of a cell managed by the access network device, a Cell-ID list including a plurality of cell identities of cells managed by the access network device, a tracking area (tracking area, TA) identity (tracking area identity, TAI), or a TAI list including a plurality of TAs.

For example, the location information may include a Cell-ID (or TAI) of a neighboring cell (or TA) in addition to the Cell-ID (or TAI) of the cell (TA) managed by the access network device. Therefore, the access network device may request, by using the location information, running information of the network slice group in the neighboring cell or TA, in addition to running information of the network slice group in the cell or TA within a management range of the access network device. Because a user in the cell managed by the access network device may be handed over to the neighboring cell in the future, and similarly, a user in the neighboring cell may be handed over to the cell managed by the access network device in the future, accuracy is higher when the access network device requests running information of the network slice in the local cell and the neighboring cell, and updates the radio resource based on the running information of the network slice in the local cell and the neighboring cell.

In operation S403, the access network device may send the request message to one or more AMFs. In this embodiment of this application, one AMF is used as an example for description.

For example, the access network device may determine, in the following manner, an AMF to which the request message is to be sent.

When the S-NSSAI list of the network slice group includes only one piece of S-NSSAI, the access network device may select any AMF from an AMF set that supports the S-NSSAI, and send the request message to the AMF. If the selected AMF does not respond to or rejects the request, the access network device selects another AMF from the AMF set, and sends the request message to the selected AMF. If no other AMFs in the AMF set may be selected, the access network device may select an AMF from another AMF set that supports the S-NSSAI.

When the S-NSSAI list of the network slice group includes a plurality of pieces of S-NSSAI, the access network device may select any piece of S-NSSAI from the plurality of pieces of S-NSSAI, select any AMF from an AMF set that supports the S-NSSAI, and then send the request message to the selected AMF.

In addition, to reduce signaling load on an AMF, the access network device may send request messages to AMFs in a round-robin mode, so that a request message may carry identification information of only one network slice group and S-NSSAI included in the network slice group.

S404. After receiving the request message sent by the access network device, the AMF sends a query request to an NWDAF.

Content included in the query request may be the same as content included in the request message. For example, if the request message includes identification information of one or more network slice groups and identification information of a network slice included in the network slice group, the query request includes the identification information of the one or more network slice groups and the identification information of the network slice included in the network slice group. If the request message includes only identification information of a network slice, the query request includes only the identification information of the network slice. If the request message includes identification information of one or more network slice groups, identification information of a network slice included in the network slice group, and location information, the query request may include the identification information of the one or more network slice groups, the identification information of the network slice included in the network slice group, and the location information.

For example, the AMF may send the query request to the NWDAF by invoking an analysis information service, for example, an Nnwdaf_Analytics_Info service, on the NWDAF.

In an embodiment, after receiving the request message sent by the access network device, the AMF does not parse out the content in the request message, but forwards the request message to the NWDAF.

For example, after receiving the request message, the AMF may generate a service invocation request sequence number to indicate an invoked Nnwdaf_Analytics_Info service, and store a correspondence between the service invocation request sequence number and identification information of the access network device. Subsequently, when forwarding a response message corresponding to the request message to the access network device, the AMF may send the response message to the access network device based on the stored correspondence.

The NWDAF collects running information of network function entities in the network slice in the network slice group, for example, running data of the network function entities and information about an application service using the network slice, and performs running analysis and network prediction. A related process and method have been described in the prior art. For details, refer to 3GPP TR 23.791. Details are not described in this application.

S405. The NWDAF obtains, based on the query request, running information of a network slice included in the network slice group, and obtains running information of the network slice group based on the obtained running information of the network slice.

The NWDAF obtains, based on the query request, the S-NSSAI list included in the network slice group. The NWDAF aggregates running information (statistical information and/or prediction information) of network slices corresponding to all S-NSSAI in the list, to obtain the running information of the network slice group. If the query request includes location information, in this process, the NWDAF may further obtain, based on the location information in the query request, running information that is of the network slices corresponding to all the S-NSSAI in the list and that is in a region (at a specified location) indicated by the location information, and perform aggregation, to obtain running information of the network slice group at the specified location. For example, the NWDAF aggregates real-time statistical results, such as quantities of registered users, quantities of users who establish a signaling connection, quantities of sessions that have been established, quantities of users who have established a signaling connection, or session traffic volumes, or analyzed prediction results, such as predicted quantities of registered users, predicted quantities of users who establish a signaling connection, predicted quantities of established sessions, predicted quantities of users who establish a signaling connection, or predicted session traffic volumes, of all the S-NSSAI included in the network slice group (at the specified location), to obtain the running information of the network slice group.

S406. The NWDAF sends the running information of the network slice group to the AMF.

The NWDAF returns, by using a query response corresponding to the query request, the running information of the network slice group to the AMF that invokes the Nnwdaf_Analytics_Info service. The query response may include the identification information of the network slice group and the running information corresponding to the network slice group.

For example, the query response may include only the identification information of the network slice group and the running information corresponding to the network slice group, and does not carry the identification information (S-NSSAI) of the network slice. If the network slice group includes only one piece of S-NSSAI, the AMF selected in operation S403 may be an AMF that supports the S-NSSAI. Therefore, after such processing, running information of a network slice can be prevented from being leaked by an unrelated AMF, thereby improving security.

S407. After receiving the running information that is of the network slice group and that is sent by the NWDAF, the AMF sends the running information of the network slice group to the access network device.

For example, the NWDAF returns the running information of the network slice group to the AMF that invokes the Nnwdaf_Analytics_Info service, so that the AMF sends running of the network slice group to the access network device based on the correspondence stored in operation S404 between the service invocation request sequence number (corresponding to the invoked the Nnwdaf_Analytics_Info service) and the identification information of the access network device.

S408. The access network device updates the radio resource of the network slice group based on the running information of the network slice group.

It should be noted that if the request message includes the identification information of the network slice, and does not include the identification information of the network slice group, the query request may include only the identification information of the network slice. The NWDAF sends, to the AMF, running information of the network slice indicated by the identification information of the network slice. The AMF sends the running information of the network slice to the access network device. The access network device performs statistical processing on the running information of the network slice based on the network slice group, to obtain the running information of the network slice group, and updates the radio resource of the network slice group based on the running information of the network slice group.

After obtaining running information of each network slice group through the foregoing operations, the access network device may dynamically adjust a radio resource of each network slice group based on the running information of each network slice group and the resource management policy.

For example, based on quantities of registered users, quantities of established sessions, predicted quantities of registered users, and predicted quantities of established sessions that are of all network slices in a network slice group and that are in a current cell and a neighboring cell, the access network device determines, based on a resource adjustment policy included in the management policy, a quantity of radio resources of the network slice group that can be spared, to release the quantity of radio resources for another network slice with a higher scheduling priority to use. For another example, based on a quantity of sessions of a uRLLC service that have been established in a neighboring cell by the network slice group, the access network device determines, based on the resource adjustment policy, that a quantity of radio resources reserved for the network slice group needs to be increased, to ensure that a user in the neighboring cell can normally hand over a session of the URLLC service to a local cell.

The resource management policy may include a grouping adjustment policy. After obtaining the running information of each network slice group, the access network device may perform re-grouping based on the grouping adjustment policy to obtain a network slice group.

For example, if the access network device determines that quantities of registered users, in a current tracking area and a neighboring tracking area, of a network slice included in a network slice group are both zero, and the network slice group has no isolation requirement, the access network device may determine, based on the grouping adjustment policy, to delete the network slice group, release a radio resource of the network slice group, and group the network slice included in the network slice group into another network slice group whose scheduling priority is the closest to that of the network slice group.

In an embodiment, the access network device may periodically perform optimization and adjustment on a network slice group and a radio resource allocated to the network slice group. In a manner 1, this may be implemented by periodically repeating S403 to S408. In a manner 2, when sending the request message to the AMF, the access network device instructs the AMF to periodically send running information of the network slice group to the access network device.

Figure 5:
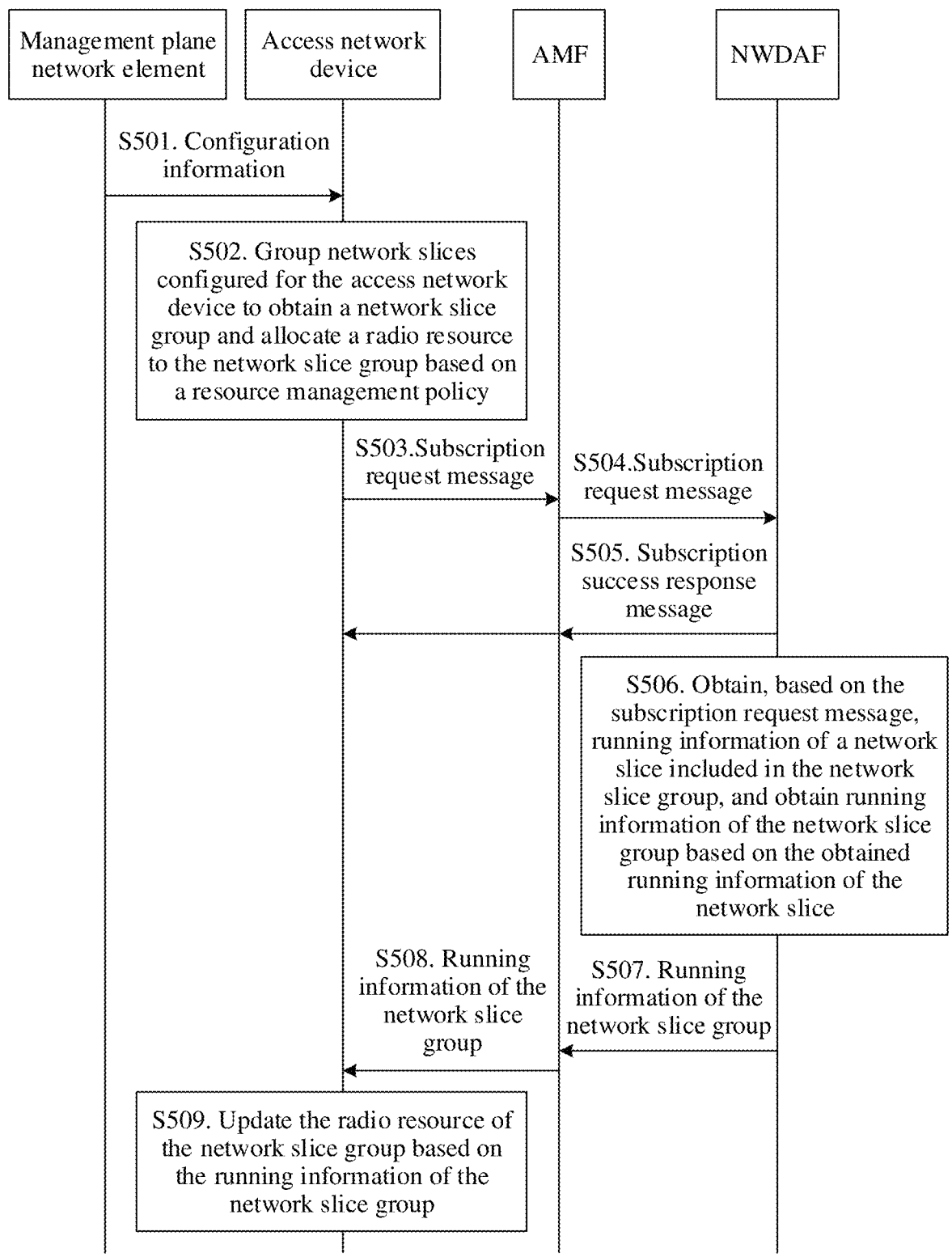
FIG. 5 is a schematic diagram of a third method for allocating a resource to a network slice according to an embodiment of this application.

Referring to FIG. 5, the manner 2 is described in detail.

For S501 and S502, refer to S401 and S402. Details are not described herein again.

S503. The access network device sends a subscription request message to the AMF.

To be distinguished from the request message in operation S402, the request message herein is named a subscription request message, and is used to subscribe to running information of a network slice group or running information of a network slice. Herein, the running information of the network slice group is used as an example. The access network device may send the request message to the AMF by using N2 interface signaling.

The access network device may further specify a push frequency of the running information that the access network device requests to subscribe to, for example, every three minutes. In other words, the subscription request message includes time information, to indicate the push frequency of the running information that the access network device requests to subscribe to. The access network device may further specify a trigger condition for immediately pushing the running information, for example, a quantity of sessions established within current 10 seconds is more than 30% higher than that within previous 10 seconds. In other words, the subscription request message includes the trigger condition, to instruct the AMF to send the running information of the network slice group to the access network device when the trigger condition is met.

In an embodiment, the subscription request message may further include location information. Therefore, the subscription request message is used to subscribe to running information of the network slice group in a region indicated by the location information. When the network slice included in the network slice group is a network slice in a particular region, if the subscription request message does not include location information, the subscription request message requests running information of the network slice group in the particular region. For detailed descriptions of the location information, refer to descriptions in the embodiment shown in FIG. 4. Details are not described herein again. For an AMF selection manner, refer to descriptions in the embodiment shown in FIG. 4. Details are not described herein again.

S504. After receiving the subscription request message from the access network device, the AMF forwards the subscription request message to an NWDAF.

For example, the AMF may forward the subscription request message to the NWDAF by invoking an Nnwdaf_Events_Subscription service of the NWDAF. To correctly forward a subscription response message corresponding to the subscription request message to the access network device, the AMF may generate a subscription request sequence number, and store a correspondence between the subscription request sequence number and identification information of the access network device.

In an embodiment, after receiving the subscription request message sent by the AMF, the NWDAF may store information included in the subscription request message, for example, an S-NSSAI list corresponding to the network slice group, the location information, the time information, and the trigger condition.

In an embodiment, in S505, the NWDAF returns a subscription success response message to the AMF. The AMF sends the response message to the access network device. The AMF finds, based on a subscription request sequence number in the response message and the stored correspondence between the subscription request sequence number and the identification information of the access network device, the access network device corresponding to the identification information of the access network device, and sends the subscription success response message to the access network device through an N2 interface.

S506. The NWDAF obtains, based on the subscription request message, running information of a network slice included in the network slice group, and obtains running information of the network slice group based on the obtained running information of the network slice.

When the subscription request message includes identification information of the network slice group, identification information of the network slice included in the network slice group, and the location information, for a specific manner of obtaining the running information of the network slice group, refer to descriptions in the embodiment shown in FIG. 4. Details are not described herein again.

S507. The NWDAF sends the running information of the network slice group to the AMF.

For example, the NWDAF may send the running information of the network slice group to the AMF at the push frequency specified by the time information included in the subscription request message.

The NWDAF adds the running information of the network slice group to a notification message and sends the notification message to the AMF at the push frequency specified by the time information included in the subscription request message.

In an embodiment, when the subscription request message further includes the trigger condition, if a network change meets the trigger condition in the subscription request message, the NWDAF sends the running information of the network slice group instantly rather than at the push frequency specified by the time information. In other words, the NWDAF does not need to wait a periodic timer corresponding to the time information to expire.

The notification message may further carry the subscription request sequence number, so that the AMF determines the access network device that requests to subscribe to the notification message.

S508. After receiving the running information of the network slice group, the AMF sends the running information of the network slice group to the access network device.

For details, refer to related descriptions in S407.

For example, the NWDAF returns the running information of the network slice group to the AMF that invokes the Nnwdaf_Events_Subscription service, so that the AMF sends the running information of the network slice group to the access network device based on the stored correspondence between the subscription request sequence number (corresponding to the invoked Nnwdaf_Analytics_Info service) and the identification information of the access network device.

For S509, refer to S408. Details are not described herein again.

Figure 6:
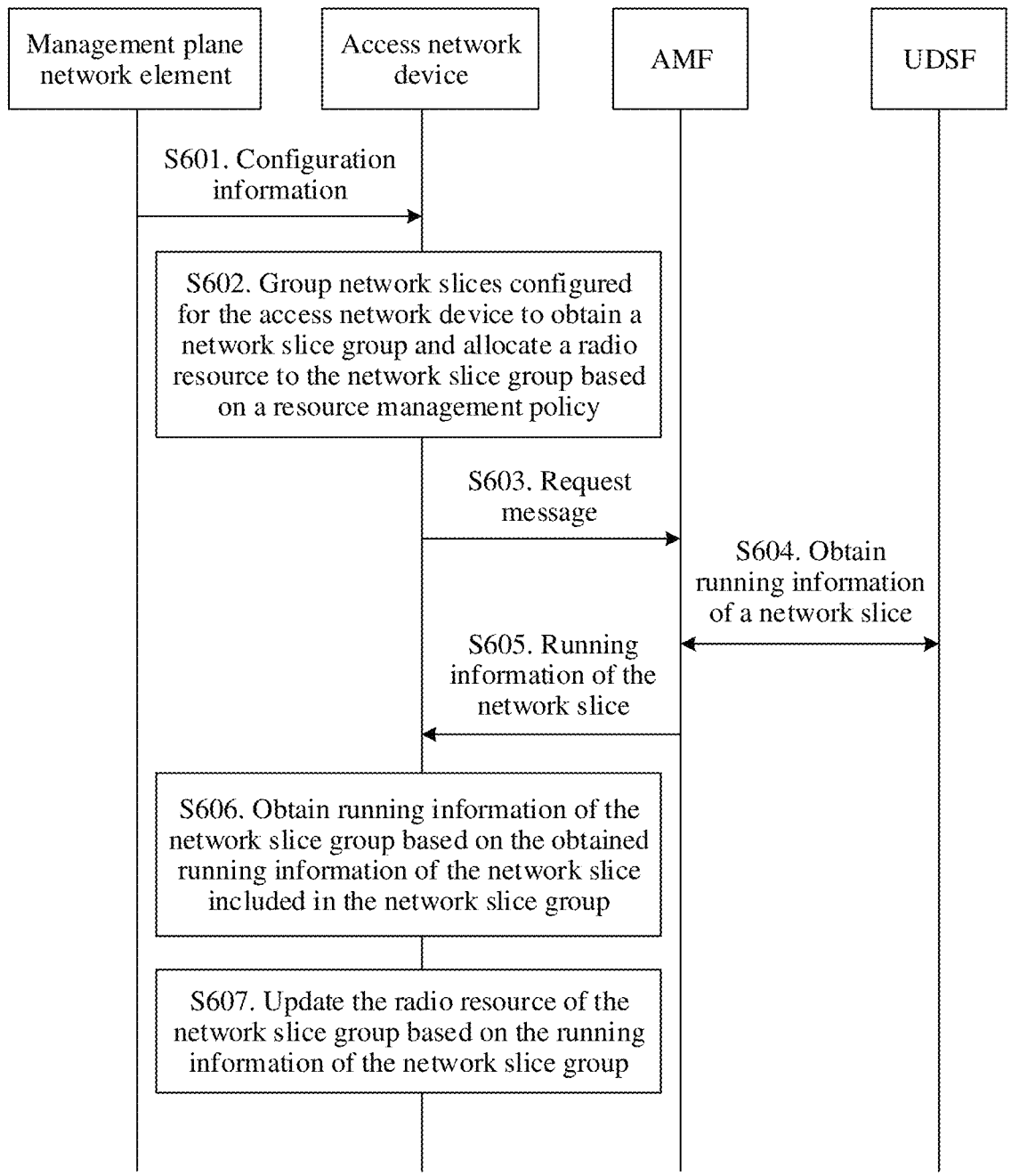
FIG. 6 is a schematic diagram of a fourth method for allocating a resource to a network slice according to an embodiment of this application.

Referring to FIG. 6, a method for allocating a resource to a network slice in the second embodiment is described in detail.

If no NWDAF is deployed in a 5G core network, an access network device may obtain some running information of a network slice from an AMF. The running information is still beneficial to the access network device in optimizing a network slice group and a radio resource of the network slice group. This embodiment is specific to a scenario in which a UDSF is deployed in each AMF set, for example, the AMF set 1 shown in FIG. 2B. Because the UDSF is deployed, all AMFs in the same AMF set store contexts of UEs in the UDSF, and any AMF can obtain, from the UDSF, the contexts of the UEs stored by the entire AMF set, and therefore can obtain running information of a network slice of the AMF set.

For S601 and S602, refer to S401 and S402. Details are not described herein again.

S603. The access network device sends a request message to an AMF.

The request message is used to request running information of a network slice. The request message may include identification information of the network slice, for example, S-NSSAI of the network slice.

For example, the access network device may send the request message to the AMF by using N2 interface signaling.

In an embodiment, the request message further includes location information. Therefore, the request message is used to request running information of the network slice in a region indicated by the location information. When the network slice is a network slice in a particular region, if the request message does not include location information, the request message requests running information of the network slice in the particular region. For descriptions of the location information, refer to descriptions in the embodiment shown in FIG. 4. Details are not described herein again.

In operation S603, the access network device may send the request message to one or more AMFs. In this embodiment of this application, one AMF is used as an example for description.

For example, the access network device may determine, in the following manner, an AMF to which the request message is to be sent. One network slice (a target network slice) is used as an example.

The access network device selects an AMF set that supports the target network slice, then selects any AMF from the AMF set, and sends the request message to the AMF. If the selected AMF does not respond to or rejects the request, the access network device selects another AMF from the AMF set, and sends the request message to the selected AMF.

Alternatively, the access network device may determine all AMF sets that support the target network slice, select any AMF from each AMF set that supports the target network slice, and send the request message to the AMF, until the request message is sent to all the AMF sets that support the target network slice.

S604. After receiving the request message from the access network device, the AMF obtains running information of a network slice by querying a UDSF.

For example, assuming that the request message includes the S-NSSAI, the AMF obtains, by querying the UDSF, the running information of the network slice identified by the S-NSSAI.

For example, the AMF collects, by querying the UDSF, statistics on all contexts that include the specified S-NSSAI and that are of UEs in all network slices supported by an entire AMF set, and calculates quantities of contexts of UEs whose states are respectively registered (RM-REGISTERED), deregistered (RM-DEREGISTERED), idle (CM-IDLE), connected (CM-CONNECTED), and having a signaling connection established (CM-CONNECTED with RRC Inactive), and a quantity of all PDU sessions that have been established and that belong to these UEs. If the request message includes the location information, based on a current location of UE in a context of the UE, the AMF queries for and collects statistics on only the running information in the region indicated by the location information.

S605. The AMF sends the running information of the network slice to the access network device.

For example, the AMF sends the running information of the network slice to the access network device by using a response message corresponding to the request message. The response message may include the S-NSSAI of the network slice and the location information in addition to the running information of the network slice.

For example, the access network device may repeat operations S603 to S605, to obtain running information of a network slice included in each network slice group.

S606. The access network device obtains running information of the network slice group based on the obtained running information of the network slice included in the network slice group.

For example, the access network device aggregates running information that is of the target network slice and that is returned by the AMF set supporting the target network slice, to obtain running information of the target network slice at the specified location (the region indicated by the location information). The access network device aggregates, based on a correspondence between a network slice group and S-NSSAI, running information of all S-NSSAI corresponding to the network slice group, to obtain the running information of the network slice group.

For S607, refer to S408. Details are not described herein again.

Figure 7:
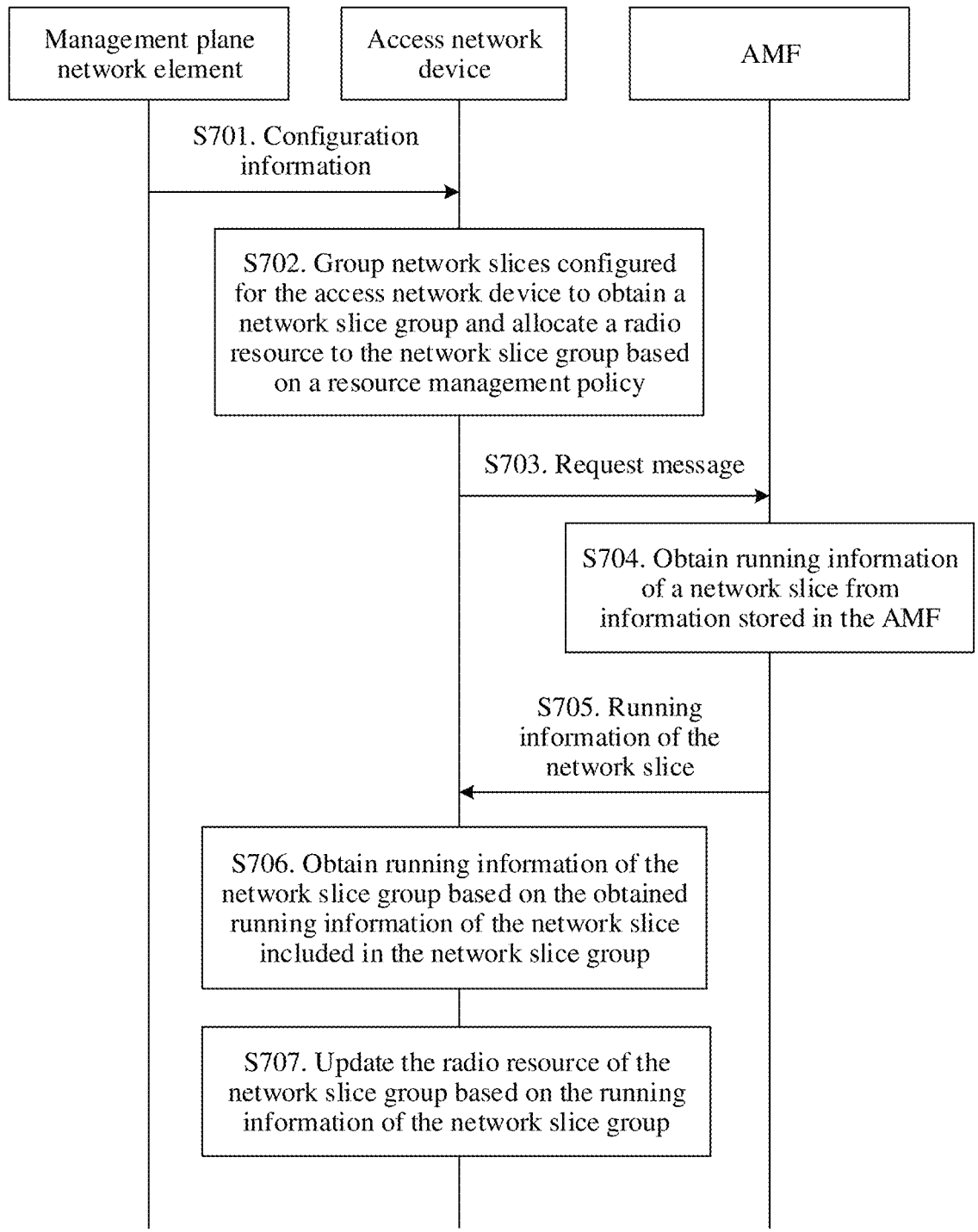
FIG. 7 is a schematic diagram of a fifth method for allocating a resource to a network slice according to an embodiment of this application.

Referring to FIG. 7, a method for allocating a resource to a network slice in the third embodiment is described in detail.

If neither an NWDAF nor a UDSF is deployed in a 5G core network, a resource may be allocated to a network slice by using this embodiment.

For S701 and S702, refer to S401 and S402. Details are not described herein again.

S703. The access network device sends a request message to an AMF.

The request message is used to request running information of a network slice.

For example, the access network device may send the request message to the AMF by using N2 interface signaling.

The request message may include identification information of the network slice, for example, S-NSSAI of the network slice.

In an embodiment, the request message further includes location information. Therefore, the request message is used to request running information of the network slice in a region indicated by the location information. When the network slice is a network slice in a particular region, if the request message does not include location information, the request message requests running information of the network slice in the particular region. For descriptions of the location information, refer to descriptions in the embodiment shown in FIG. 4. Details are not described herein again.

In operation S703, the access network device needs to send the request message to a plurality of AMFs. In this embodiment of this application, one AMF is used as an example for description.

For example, the access network device may determine, in the following manner, AMFs to which the request message is to be sent. One network slice (a target network slice) is used as an example.

The access network device selects an AMF set that supports the target network slice, and then sends the request message to each AMF in the AMF set.

S704. After receiving the request message from the access network device, the AMF obtains the running information of the network slice from information stored in the AMF.

For example, assuming that the request message includes the S-NSSAI, the AMF may obtain, by querying the information stored in the AMF, the running information of the network slice identified by the S-NSSAI.

For example, the AMF obtains contexts of UEs of the S-NSSAI by querying the information stored in the AMF, and calculates quantities of contexts of UEs whose states are respectively registered (RM-REGISTERED), deregistered (RM-DEREGISTERED), idle (CM-IDLE), connected (CM-CONNECTED), and having a signaling connection established (CM-CONNECTED with RRC Inactive), and a quantity of all PDU sessions that have been established and that belong to these UEs. If the request message includes location information, based on a current location of UE in a context of the UE, the AMF queries for and collects statistics on only the running information in the region indicated by the location information.

If the AMF is faulty or in a deactivated state, the AMF may not process the received request message.

When an AMF indicated by a globally unique AMF ID (GUAMI) in a backup context of UE is faulty or deactivated, the AMF may also count the backup context of the UE.

S705. The AMF sends the running information of the network slice to the access network device.

For operation S705, refer to related descriptions of S605. Details are not described herein again.

S706. The access network device obtains running information of the network slice group based on the obtained running information of the network slice included in the network slice group.

For example, the access network device aggregates, based on a network slice dimension, the running information that is of the network slice and that is returned by the AMF, to obtain running information of the network slice in a specified location area. The network slice dimension may be a registered user in the network slice, a user who has established a signaling connection in the network slice, a session that has been established in the network slice, or the like. Then, the access network device aggregates running information of network slices based on a network slice group to which the network slices belong, to obtain running information of the network slice group, and updates a radio resource of the network slice group based on the running information of the network slice group.

For S707, refer to S607. Details are not described herein again.

Figure 8:
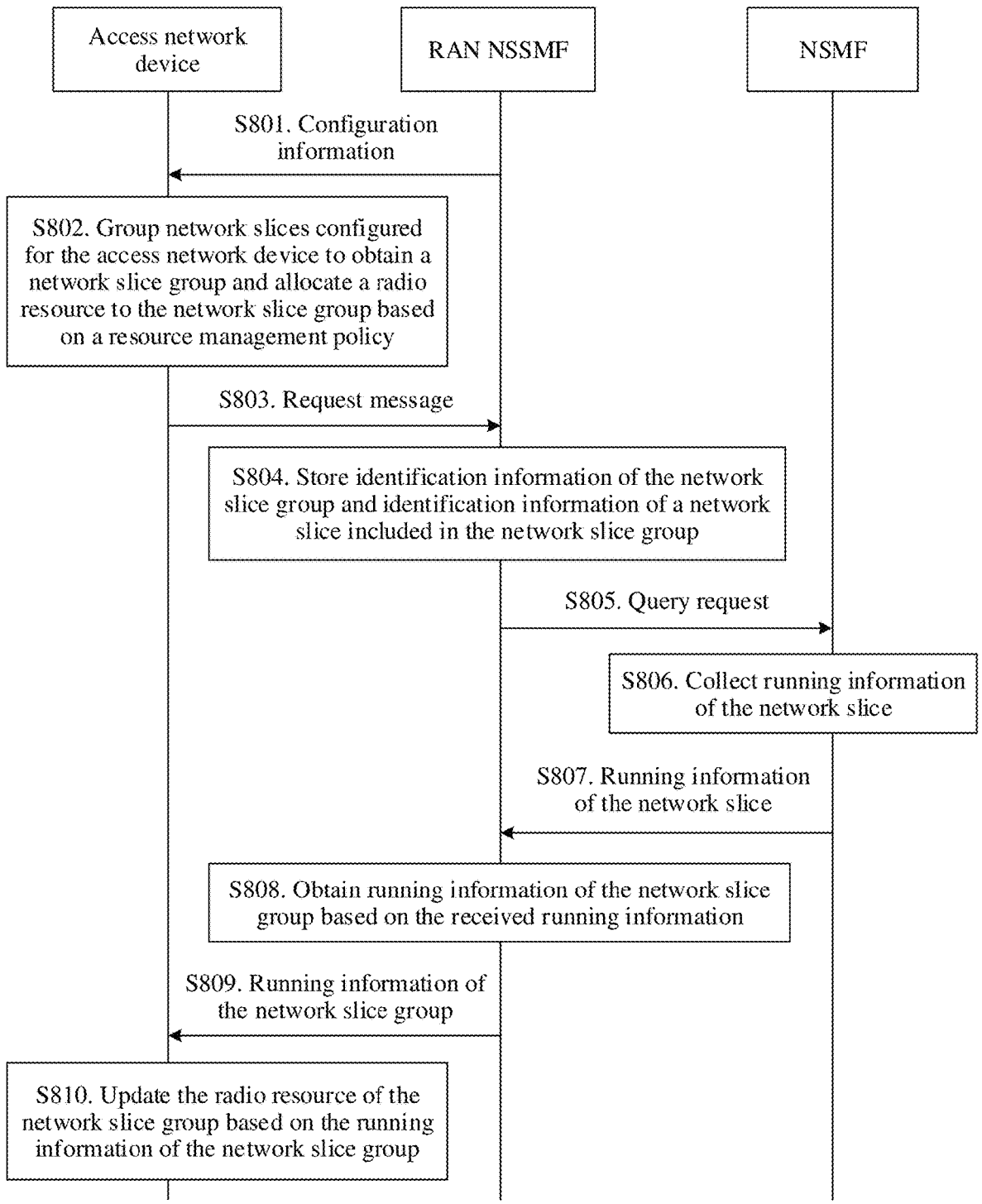
FIG. 8 is a schematic diagram of a sixth method for allocating a resource to a network slice according to an embodiment of this application.

FIG. 8 shows a method for allocating a resource to a network slice according to an embodiment of this application. In the method, an example in which an access network device obtains running information of a network slice or running information of a network slice group from a management plane network element is used for description.

For S801 and S802, refer to S401 and S402. Details are not described herein again.

S803. The access network device sends a request message to a RAN NSSMF.

The request message is used to request running information of a network slice group.

For example, network slices configured on the access network device may be grouped into one or more network slice groups. The network slice group includes one or more network slices. When the network slices configured on the access network device are grouped into one network slice group, the request message is used to request running information of the network slice group. When the network slices configured on the access network device are grouped into a plurality of network slice groups, the request message is used to request running information of the plurality of network slice groups. In this embodiment of this application, one network slice group is used as an example for description.

The request message includes identification information of the network slice group and identification information of a network slice included in the network slice group, for example, one or more pieces of S-NSSAI corresponding to the network slice group. The request message may further include location information. For related descriptions of the location information, refer to related descriptions in the embodiment corresponding to FIG. 4. Details are not described herein again.

S804. The RAN NSSMF stores the identification information of the network slice group and the identification information of the network slice included in the network slice group.

S805. The RAN NSSMF sends a query request to an NSMF.

The query request is used to request running information of the network slice included in the network slice group. The query request may include the identification information of the network slice, for example, S-NSSAI or an S-NSSAI list.

S806. The NSMF collects running information of the network slice based on the query request.

For example, when the query request includes the S-NSSAI, the NSMF collects a quantity of registered users, a quantity of established sessions, a session traffic volume, or the like, at a specified location, of the network slice corresponding to the S-NSSAI. When the query request includes the S-NSSAI list, the NSMF collects a quantity of registered users, a quantity of established sessions, a session traffic volume, or the like, at a specified location, of a network slice corresponding to each piece of S-NSSAI in the S-NSSAI list.

For example, that the NSMF collects running information of a network slice may be that the NSMF obtains, from a CN NSSMF, running information such as a quantity of registered users, a quantity of established sessions, or a session traffic volume of the network slice at the specified location.

S807. The NSMF sends the running information of the network slice to the RAN NSSMF.

S808. The RAN NSSMF obtains running information of the network slice group based on the received running information of the network slice.

Specifically, based on a pre-stored S-NSSAI list corresponding to the network slice group, running information (at the specified location) corresponding to all S-NSSAI in the list is aggregated, to obtain the running information of the network slice group.

S809. The RAN NSSMF sends the running information of the network slice group to the access network device.

For S810, refer to S408. Details are not described herein again.

Figure 9:
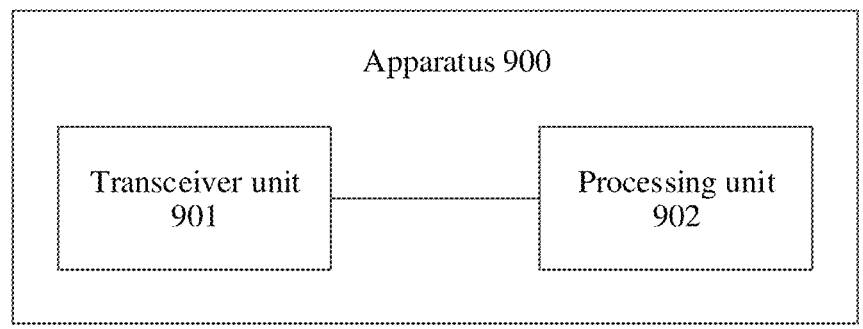
FIG. 9 is a schematic diagram of an apparatus 900 according to an embodiment of this application.

Based on a same inventive concept as the method embodiments, as shown in FIG. 9, this application further provides an apparatus 900, which may include a transceiver unit 901 and a processing unit 902.

In an embodiment, the apparatus 900 may be applied to an access network device. The transceiver unit 901 may be configured to send a request message to an AMF, or receive the resource allocation reference information from the AMF, or receive configuration information sent by a management plane network element, and the like. The processing unit 902 may be configured to update, based on the resource allocation reference information, a radio resource of the network slice group, and perform grouping processing, resource allocation, resource update processing, and the like. Specifically, the processing unit 902 may be configured to implement a function performed by the access network device in any one of the embodiments in FIG. 3 to FIG. 8.

In an embodiment, the apparatus 900 may be applied to an AMF. The transceiver unit 901 is configured to receive a request message, send a query request, and the like. The processing unit 902 may be configured to obtain resource allocation reference information and the like, and may be specifically configured to implement a function performed by the AMF in any one of the embodiments in FIG. 3 to FIG. 8.

In an embodiment, the apparatus 900 may be applied to an NWDAF. The transceiver unit 901 may be configured to receive a query request. The processing unit 902 may be configured to collect resource allocation reference information. For a specific processing process, refer to a processing function performed by the NWDAF in any one of the embodiments in FIG. 3 to FIG. 8. After collecting the resource reference information, the processing unit 902 sends the resource reference information to an AMF by using the transceiver unit 902.

Figure 10:
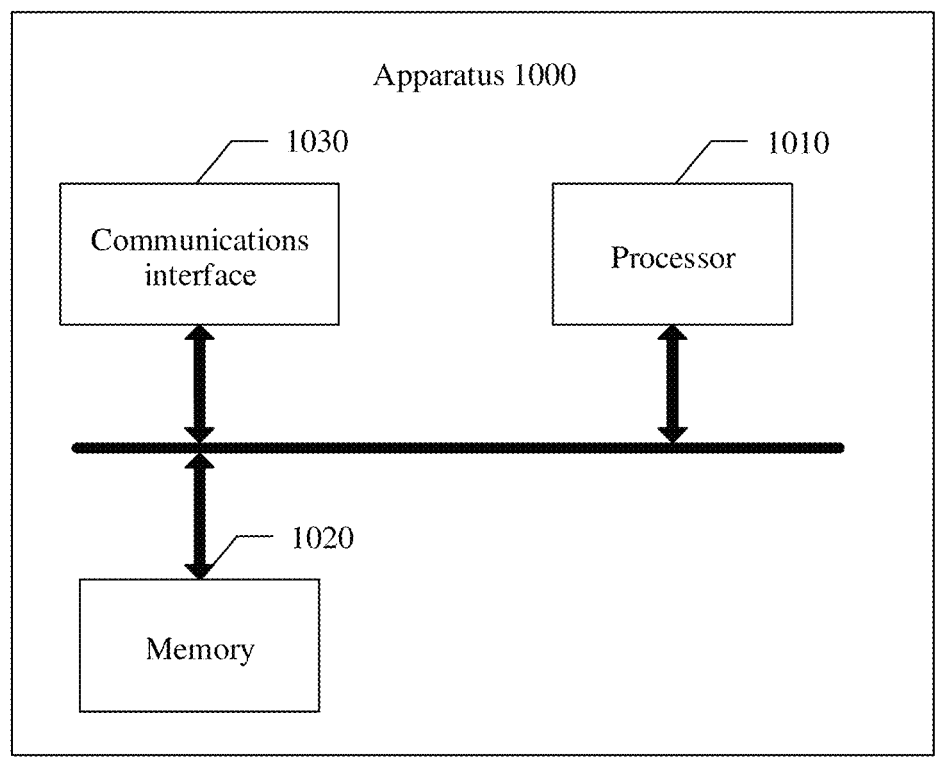
FIG. 10 is a schematic diagram of an apparatus 1000 according to an embodiment of this application.

Based on a same concept, as shown in FIG. 10, this application provides an apparatus 1000. The apparatus 1000 includes at least one processor 1010, for example, performing the method in the foregoing embodiment. The apparatus may further include at least one memory 1020, configured to store a program instruction and/or data. The memory 1020 is coupled to the processor 1010. The coupling in this embodiment of this application is indirect coupling or a communication connection between apparatuses, units, or modules for information exchange between the apparatuses, the units, or the modules, and may be in electrical, mechanical, or other forms. The processor 1010 may cooperate with the memory 1020. The processor 1010 may execute the program instruction stored in the memory 1020, so that the processor 1010 invokes the program instruction, to implement a function of the processor 1010. In an embodiment, at least one of the at least one memory 1020 may be included in the processor 1010. The apparatus 1000 may further include a communications interface 1030. The apparatus 1000 may exchange information with another device by using the communications interface 1030. The communications interface 1030 may be a circuit, a bus, a transceiver, or any other apparatus that can be configured to exchange information.

In an embodiment, the apparatus 1000 is applied to an access network device. Specifically, the apparatus 1000 may be the access network device, or may be an apparatus that can support the access network device in implementing a function of the access network device in the methods in FIG. 3 to FIG. 8. For example, at least one processor 1010 in the apparatus 1000 is configured to implement the function of the access network device in the methods in FIG. 3 to FIG. 8.

In an embodiment, the apparatus 1000 is applied to an AMF. Specifically, the apparatus 1000 may be the AMF, or may be an apparatus that can support the AMF in implementing a function of the AMF in the methods in FIG. 3 to FIG. 8. For example, at least one processor 1010 in the apparatus 1000 is configured to implement the function of the AMF in the methods in FIG. 3 to FIG. 8.

In an embodiment, the apparatus 1000 may be applied to an NWDAF. Specifically, the apparatus 1000 may be an NWDAF, or may be an apparatus that can support the NWDAF in implementing a function of the NWDAF in the methods in FIG. 3 to FIG. 8. For example, at least one processor 1010 in the apparatus 1000 is configured to implement the function of the NWDAF in the methods in FIG. 3 to FIG. 8.

For example, the apparatus 1000 may be a chip or a chip system. In an embodiment, in this embodiment of this application, the chip system may include a chip, or may include a chip and another discrete device.

A specific connection medium between the communications interface 1030, the processor 1010, and the memory 1020 is not limited in this embodiment of this application. In this embodiment of this application, the memory 1020, the processor 1010, and the communications interface 1030 are connected by using a bus in FIG. 10. The bus is represented by using a bold line in FIG. 10. Such a manner of connection between components is merely an example for description, and imposes no limitation. The bus may be classified into an address bus, a data bus, a control bus, and the like. For ease of representation, only one thick line is used to represent the bus in FIG. 10, but this does not mean that there is only one bus or only one type of bus.

In the embodiments of this application, the processor may be a general processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general purpose processor may be a microprocessor or any conventional processor or the like. The operations of the method disclosed with reference to the embodiments of this application may be directly performed by a hardware processor, or may be performed by using a combination of hardware in the processor and a software module.

In this embodiment of this application, the memory may be a non-volatile memory, such as a hard disk drive (HDD) or a solid-state drive (SSD), or may be a volatile memory, such as a random-access memory (RAM). The memory may alternatively be, but is not limited to, any other medium that can be used to carry or store expected program code in a form of an instruction or a data structure and that can be accessed by a computer. The memory in this embodiment of this application may alternatively be a circuit or any other apparatus that can implement a storage function, to store a program instruction and/or data.

Figure 11:
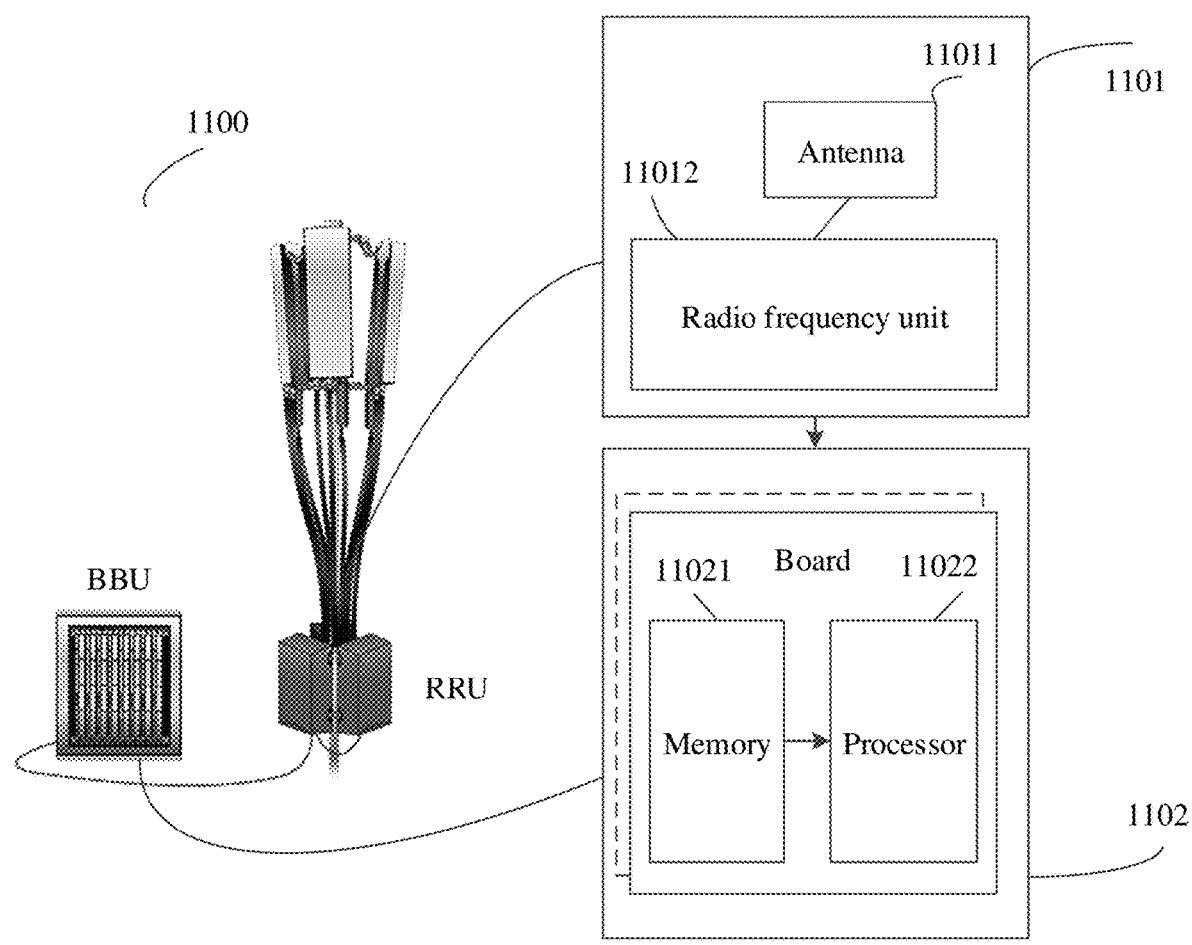
FIG. 11 is a schematic structural diagram of an access network device according to an embodiment of this application.

According to the foregoing method, as shown in FIG. 11, an embodiment of the present disclosure further provides a schematic structural diagram of an access network device, for example, a base station.

The base station may be applied to a scenario of a communications system shown in FIG. 1, FIG. 2A, or FIG. 2B. The base station 1100 includes one or more radio frequency units, for example, a remote radio unit (RRU) 1101, and one or more baseband units (BBU) (which may also be referred to as a digital unit, DU) 1102. The RRU 1101 may be referred to as a transceiver unit, a transceiver, a transceiver circuit, or the like, and may include at least one antenna 11011 and a radio frequency unit 11012. The RRU 1101 part may be configured to receive and send radio frequency signals and perform conversion between a radio frequency signal and a baseband signal, for example, configured to send the signaling indication and/or the reference signal in the foregoing embodiments to a terminal device. The BBU 1102 part may be configured to perform baseband processing, control the base station, and the like. The RRU 1101 and the BBU 1102 may be physically disposed together, or may be physically disposed separately. In other words, the base station is a distributed base station.

The BBU 1102 is a control center of the base station, may also be referred to as a processing unit, and may be configured to complete baseband processing functions such as channel coding, multiplexing, modulation, and spectrum spreading. For example, the BBU (processing unit) may be configured to control the base station to perform the method that is performed by the access network device and that is shown in any one of FIG. 3 to FIG. 8.

In an example, the BBU 1102 may include one or more boards. A plurality of boards may jointly support a radio access network (for example, an LTE network) of a single access standard, or may separately support radio access networks of different access standards. The BBU 1102 further includes a memory 11021 and a processor 11022. The memory 11021 is configured to store a necessary instruction and necessary data. For example, the memory 11021 stores the correspondence between information about a transmission delay difference and the transmission delay difference in the foregoing embodiment. The processor 11022 is configured to control the base station to perform a necessary action. The memory 11021 and the processor 11022 may serve one or more boards. In other words, each board may be separately provided with a memory and a processor. Alternatively, a plurality of boards may share the same memory and processor. In addition, each board may be further provided with a necessary circuit.

According to the method provided in the embodiments of this application, an embodiment of the present disclosure further provides a communications system, including one or more of the foregoing access network device, AMF, and NWDAF.

Based on the foregoing embodiments, an embodiment of this application further provides a computer storage medium. The storage medium stores a software program. When read and executed by one or more processors, the method provided in any one or more of the foregoing embodiments may be implemented. The computer storage medium may include: any medium that can store program code, such as a removable hard disk, a read-only memory, a random access memory, a magnetic disk, or an optical disc.

Based on the foregoing embodiments, an embodiment of this application further provides a chip. The chip includes a processor, configured to implement a function in any one or more of the foregoing embodiments, for example, obtain or process information or a message in the foregoing method. In an embodiment, the chip further includes a memory. The memory is configured to store a necessary program instruction and necessary data that are executed by the processor. The chip may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

A person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for allocating a resource to a network slice, comprising:
    sending, by an access network device, a request message to an access and mobility management function (AMF), wherein the request message is used to request resource allocation reference information of a network slice group, the resource allocation reference information comprises running information of a network slice of the network slice group or running information of the network slice group;
    receiving, by the access network device, the resource allocation reference information from the AMF; and
    updating, by the access network device, a radio resource of the network slice group based on the resource allocation reference information.

2. The method according to claim 1, wherein when the request message comprises identification information of the network slice, the resource allocation reference information comprises the running information of the network slice.

3. The method according to claim 2, wherein the request message further comprises location information, and the request message is used to request running information of the network slice in a region indicated by the location information.

4. The method according to claim 1, wherein the running information of the network slice comprises at least one of statistical information of the network slice or prediction information of the network slice;
    the statistical information of the network slice comprises a statistical measurement indicator of the network slice used to evaluate resource occupancy of the network slice in preset duration; and
    the prediction information of the network slice comprises a predicted value of the statistical measurement indicator of the network slice used to predict evaluated resource occupancy of the network slice.

5. The method according to claim 4, wherein the statistical measurement indicator of the network slice comprises at least one of the following: a quantity of registered users of the network slice, a quantity of users who have established a signaling connection in the network slice, a quantity of sessions that have been established in the network slice, or a session traffic volume in the network slice; or
    wherein the predicted value of the statistical measurement indicator of the network slice comprises at least one of the following: a predicted quantity of registered users of the network slice, a predicted quantity of users who establish a signaling connection in the network slice, a predicted quantity of established sessions in the network slice, or a predicted session traffic volume of the network slice.

6. The method according to claim 1, wherein when the resource allocation reference information comprises the running information of the network slice, updating a radio resource of the network slice group based on the resource allocation reference information comprises:
    obtaining, by the access network device, the running information of the network slice group based on the running information of the network slice; and
    updating, by the access network device, the radio resource of the network slice group based on the running information of the network slice group.

7. The method according to claim 1, wherein when the request message comprises identification information of the network slice group and identification information of a network slice comprised in the network slice group, the resource allocation reference information comprises the running information of the network slice group.

8. The method according to claim 7, wherein the request message further comprises location information, and the request message is used to request running information of the network slice group in a region indicated by the location information.

9. The method according to claim 1, wherein the running information of the network slice group comprises at least one of statistical information of the network slice group and prediction information of the network slice group;
    the statistical information of the network slice group comprises a statistical measurement indicator of the network slice group used to evaluate resource occupancy of the network slice group in preset duration; and
    the prediction information of the network slice group comprises a predicted value of the statistical measurement indicator of the network slice group used to predict evaluated resource occupancy of the network slice.

10. The method according to claim 9, wherein the statistical measurement indicator of the network slice group comprises at least one of the following: a quantity of registered users of a corresponding network slice group, a quantity of sessions of the corresponding network slice group that have been established, a session traffic volume in the network slice, or a session traffic volume corresponding to the network slice group; or
    the predicted value of the statistical measurement indicator of the network slice group comprises at least one of the following: a predicted quantity of registered users of a corresponding network slice group, a predicted quantity of users who establish a signaling connection in the network slice, a predicted quantity of established sessions of the corresponding network slice group, or a predicted session traffic volume corresponding to the network slice group.

11. The method according to claim 1, wherein updating a radio resource of the network slice group based on the resource allocation reference information comprises:
updating, by the access network device, the radio resource of the network slice group based on the resource allocation reference information and a resource management policy.

12. The method according to claim 11, wherein the resource management policy comprises a grouping adjustment policy and a resource adjustment policy; and
wherein updating the radio resource of the network slice group based on the resource allocation reference information and a resource management policy comprises:
updating, by the access network device, the network slice group based on the grouping adjustment policy and the resource allocation reference information; and
updating, by the access network device, a radio resource of the updated network slice group based on the resource adjustment policy and running information of the updated network slice group.

13. The method according to claim 12, wherein the resource management policy further comprises a resource allocation policy and an initial grouping policy; and
before sending a request message to an AMF, the method further comprises:
obtaining, by the access network device, indication information based on the identification information of the network slice, wherein the indication information comprises at least one of a network slice type indication of the network slice or an isolation requirement indication of a tenant to which the network slice belongs;
grouping, by the access network device, the network slice into the network slice group based on the indication information and the initial grouping policy; and
allocating, by the access network device, the radio resource to the network slice group based on the resource allocation policy.

14. The method according to claim 1, wherein the resource allocation reference information comprises the running information of the network slice, and the method further comprises:
grouping, by the access network device, the network slice into a newly added network slice group based on the running information of the network slice; and
allocating, by the access network device, a radio resource to the newly added network slice group based on the running information of the network slice.

15. A method for allocating a resource to a network slice, comprising:
receiving, by an access and mobility management function (AMF), a request message from an access network device, wherein the request message is used to request resource allocation reference information of a network slice group, the resource allocation reference information comprises running information of a network slice of the network slice group or running information of the network slice group; and
sending, by the AMF, the resource allocation reference information to the access network device based on the request message.

16. The method according to claim 15, wherein:
when the request message comprises identification information of the network slice, the resource allocation reference information comprises the running information of the network slice; or
when the request message comprises identification information of the network slice group and identification information of a network slice comprised in the network slice group, the resource allocation reference information comprises the running information of the network slice group.

17. The method according to claim 16, wherein when the request message further comprises location information, the running information of the network slice comprises running information of the network slice in a region indicated by the location information; or the running information of the network slice group comprises running information of the network slice group in a region indicated by the location information.

18. The method according to claim 15, wherein the running information of the network slice group comprises at least one of statistical information of the network slice group or prediction information of the network slice group;
the statistical information of the network slice group comprises a statistical measurement indicator of the network slice group used to evaluate resource occupancy of the network slice group in preset duration; and
the prediction information of the network slice group comprises a predicted value of the statistical measurement indicator of the network slice group used to predict evaluated resource occupancy of the network slice.

19. The method according to claim 18, wherein the statistical measurement indicator of the network slice group comprises at least one of the following: a quantity of registered users of the network slice group, a quantity of users of the network slice group who establish a signaling connection, a quantity of sessions of the network slice group that have been established, or a session traffic volume corresponding to the network slice group; or
the predicted value of the statistical measurement indicator of the network slice group comprises at least one of the following: a predicted quantity of registered users of the network slice group, a predicted quantity of users of the network slice group who establish a signaling connection, a predicted quantity of established sessions of the network slice group, or a predicted session traffic volume corresponding to the network slice group.

20. An apparatus for allocating a resource to a network slice, comprising:
a processor; and
a memory storing instructions, which when executed by the processor, cause the processor to perform operation, the operations comprising:
sending a request message to an access and mobility management function (AMF) to request resource allocation reference information of a network slice group, wherein the resource allocation reference information comprises running information of a network slice of the network slice group or running information of the network slice group;
receiving the resource allocation reference information from the AMF; and
updating a radio resource of the network slice group based on the resource allocation reference information.

* * * * *